(12) United States Patent
Kitagata

(10) Patent No.: US 8,958,095 B2
(45) Date of Patent: Feb. 17, 2015

(54) RELAY SERVER, RELAY SERVER CONTROL METHOD, AND STORAGE MEDIUM

(71) Applicant: Canon Kabushiki Kaisha, Tokyo (JP)

(72) Inventor: Kei Kitagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 13/681,739

(22) Filed: Nov. 20, 2012

(65) Prior Publication Data

US 2013/0148155 A1 Jun. 13, 2013

(30) Foreign Application Priority Data

Dec. 13, 2011 (JP) ................. 2011-272656

(51) Int. Cl.
*G06F 15/00* (2006.01)
*G06F 3/12* (2006.01)
*H04L 29/12* (2006.01)

(52) U.S. Cl.
CPC ............ *G06F 3/1294* (2013.01); *G06F 3/1203* (2013.01); *G06F 3/1229* (2013.01); *G06F 3/1272* (2013.01); *G06F 3/1287* (2013.01); *G06F 3/1288* (2013.01); *H04L 61/30* (2013.01)
USPC ......................................................... 358/1.15

(58) Field of Classification Search
CPC .................................................... G06F 3/1294
USPC .......................................................... 358/1.15
See application file for complete search history.

(56) References Cited

U.S. PATENT DOCUMENTS 7,345,779 B2   3/2008  Tamai et al.
2007/0076253 A1*  4/2007  Shima ......................... 358/1.15

FOREIGN PATENT DOCUMENTS

JP   2003-196054 A   7/2003

* cited by examiner

*Primary Examiner* — Saeid Ebrahimi Dehkordy
(74) *Attorney, Agent, or Firm* — Carter, DeLuca, Farrell & Schmidt, LLP

(57) ABSTRACT

An information processing device acquires status information of a printer, and adds a status name indicating the acquired status information to a printer name of the printer and updates a printer name in printer information corresponding to the printer managed by a print service device with the printer name to which the status name has been added. Also, the print service device manages printer information undated with the printer name to which the status name has been added, and generates a print setting screen, on which the printer name to which the status name has been added is to be displayed, based on the printer information managed by the print service device and transmits the generated print setting screen to a user device.

5 Claims, 17 Drawing Sheets

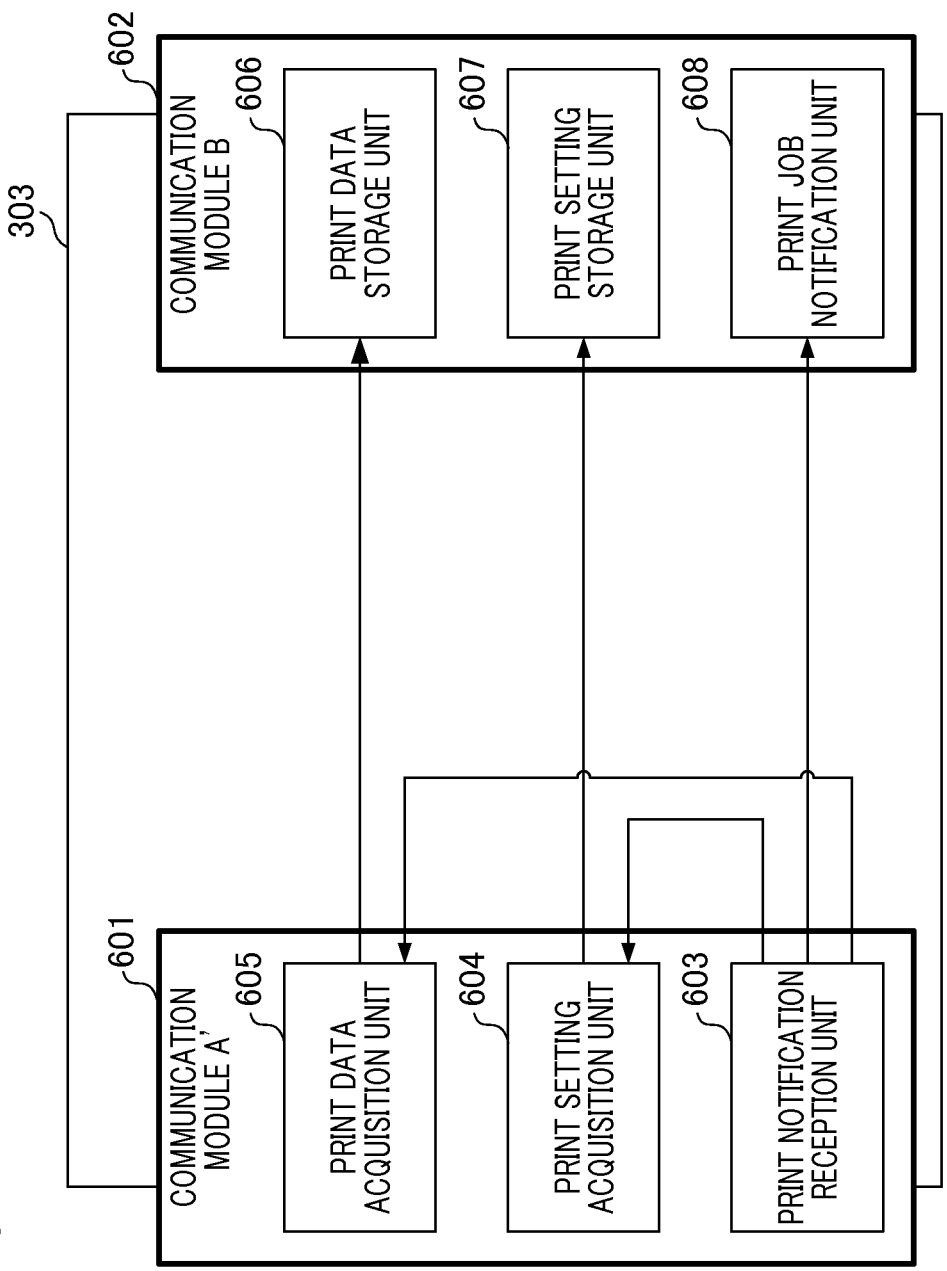

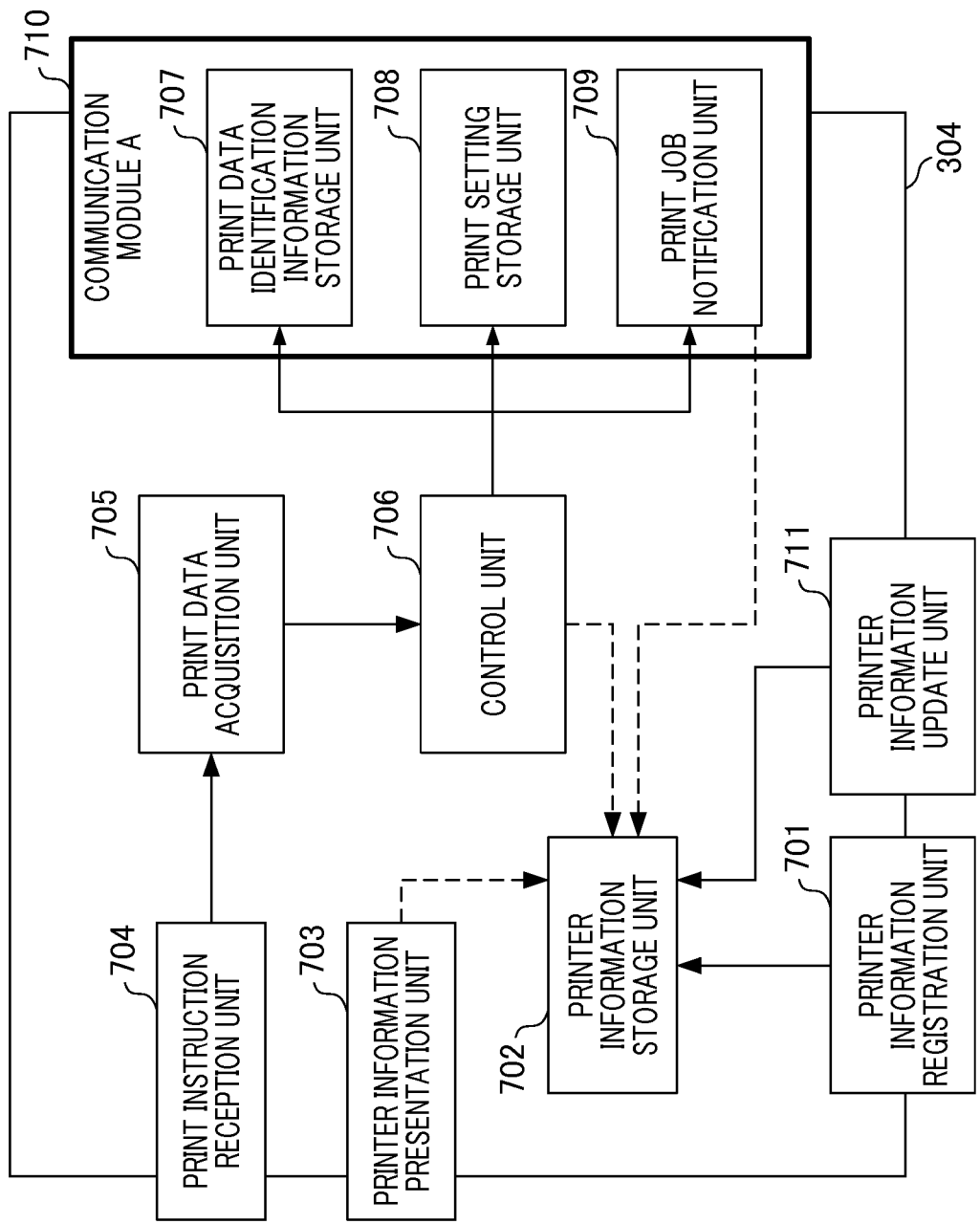

FIG. 8A

| ServiceName |
| --- |
| Print Service A |
| Print Service B |

FIG. 8B

| 801 | 802 | 803 | 804 | 805 | 806 | 807 | 808 | 809 | 810 | 811 |
| --- | --- | --- | --- | --- | --- | --- | --- | --- | --- | --- |
| Virtual Printer ID | Service Name | Real Printer ID | Printer Kind | Service Printer ID | Name | Status | Status Updatetime | Capabilities | User ID | Password |
| VPBCH-8EA1CB19-5D9E | Print Service A | RP-E2B53416-B536 | AAA | SP-5D15DEAF-BE3C | Printer1(Offline) | Offline | 2009/10/29 | ... | User A | Use A |
| VPBCH-94E1E881-BEFA | Print Service A | RP-E5BF5531-CAF9 | AAB | SP-2336ACD3-4D27 | Printer2(Ready) | Ready | 2011/09/20 | ... | User A | User A |
| VPBCH-D24B4912-2866 | Print Service A | RP-677F2761-B68D | AAC | SP-1AE5A901-3D8C | Printer3(No Paper) | No Paper | 2011/04/05 | ... | User A | User A |
| VPBCH-40BDE35B-A6D4 | Print Service B | RP-2080F643-FB08 | AAD | SP-F5C17CC0-1877 | Printer4(Ready) | Ready | 2010/12/13 | ... | User B | User B |
| VPBCH-A4DB3F7A-0123 | Print Service B | RP-DE0E88F6-6115 | AAE | SP-4120C0A0-99A3 | Printer5(Paper Jam) | Toner Low | 2009/11/13 | ... | User B | User B |

FIG. 8C

| 812 | 813 | 814 | 815 | 816 | 817 |
| --- | --- | --- | --- | --- | --- |
| User ID | Service Printer ID | Name | Capabilities | Status | Virtual Printer ID |
| User A | SP-5D15DEAF-BE3C | Printer1(Offline) | ... | Offline | VPBCH-8EA1CB19-5D9E |
| User A | SP-2336ACD3-4D27 | Printer2(Ready) | ... | Ready | VPBCH-94E1E881-BEFA |
| User A | SP-1AE5A901-3D8C | Printer3(No Paper) | ... | No Paper | VPBCH-D24B4912-2866 |
| User B | SP-F5C17CC0-1877 | Printer4(Ready) | ... | Ready | VPBCH-40BDE35B-A6D4 |
| User B | SP-4120C0A0-99A3 | Printer5(Toner Low) | ... | Paper Jam | VPBCH-A4DB3F7A-0123 |
| User A | SP-11F0A122-57B8 | Printer6(Ready) | ... | Ready | VPBCH-E234AFDD-2345 |

FIG. 9A

| 901 |
|---|
| status |
| Ready |
| Offline |
| Sleeping |
| Printing |
| Toner Low |
| No Paper |
| Paper Jam |
| Cover Open |
| Out of Toner |
| Tray Full |
| Error |
| Status Unknown |

FIG. 9B

| 902 | 903 Display String | | | | | | | | | | | |
|---|---|---|---|---|---|---|---|---|---|---|---|---|
| Language | Ready | Offline | Sleeping | Printing | Toner Low | No Paper | Paper Jam | Cover Open | Out of Toner | Tray Full | Error | Status Unknown |
| Japanese | 印刷可能 | オフライン | スリープ中 | 印刷中 | トナーロウ | 用紙切れ | 紙づまり | カバーオープン | トナーなし | 排紙ビンフル | エラー | 状態不明 |
| English | Ready | Offline | Sleeping | Printing | Toner Low | No Paper | Paper Jam | Cover Open | Out of Toner | Tray Full | Error | Status Unknown |
| French | ... | ... | ... | ... | ... | ... | ... | ... | ... | ... | ... | ... |
| German | ... | ... | ... | ... | ... | ... | ... | ... | ... | ... | ... | ... |
| Italian | ... | ... | ... | ... | ... | ... | ... | ... | ... | ... | ... | ... |
| Spanish | ... | ... | ... | ... | ... | ... | ... | ... | ... | ... | ... | ... |
| Chinese | ... | ... | ... | ... | ... | ... | ... | ... | ... | ... | ... | ... |
| Korean | ... | ... | ... | ... | ... | ... | ... | ... | ... | ... | ... | ... |
| ... | ... | ... | ... | ... | ... | ... | ... | ... | ... | ... | ... | ... |

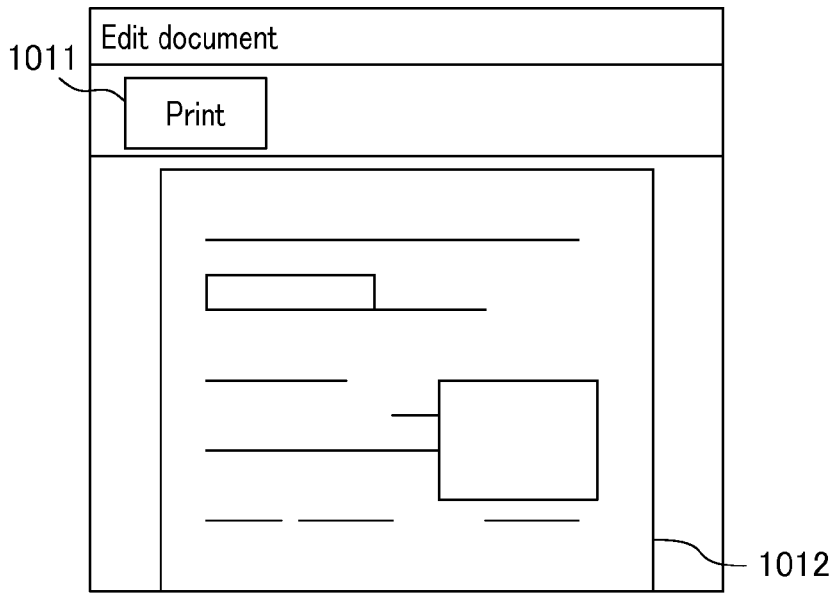

FIG. 12A

| Printer List | |
|---|---|
| Printer List: | Status Update — 1013 |
| ○ | Printer1 (Offline) |
| ⊙ | Printer2 (Ready) |
| ○ | Printer3 (No Paper) |
| ○ | Printer6 (Ready) |

Next

FIG. 12B

| Printer List | |
|---|---|
| Printer List: | |
| ○ | Printer1 (Offline:10/29/2009) |
| ⊙ | Printer2 (Ready:9/20/2011) |
| ○ | Printer3 (No Paper:4/5/2011) |
| ○ | Printer6 (Ready:11/1/2011) |

Next

FIG. 13A

```
<Capabilities>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
</Capabilities>
```

FIG. 13B

```
<PrintSettings>
    <Duplex>
        <Item>2-Side</Item>
    </Duplex>
    <Color>
        <Item>mono</Item>
    </Color>
    <PaperSize>
        <Item>A4</Item>
    </PaperSize>
</PrintSettings>
```

FIG. 13C

```
<PrintJob>
    <id>
        <Item>5846759561318635695</Item>
    </id>
    <title>
        <Item>Doc1</Item>
    </title>
    <status>
        <Item>QUEUED</Item>
    </status>
    <dataUrl>
        <Item>http://prt.srv.com/data/5846759561318635695</Item>         ─ 1101
    </dataUrl>
    <settingUrl>
        <Item>http://prt.srv.com/setting/5846759561318635695</Item>      ─ 1102
    </settingUrl>
</PrintJob>
```

FIG. 13D

```
<PrintJob>
    <id>
        <Item>5846759561318635695</Item>
    </id>
    <title>
        <Item>Doc1</Item>
    </title>
    <status>
        <Item>QUEUED</Item>
    </status>
    <dataUrl>
        <Item>http://vprinter.com/VP8CH67YXF42BBF2TQ449H8XA              ─ 1103
            /data/5846759561318635695</Item>
    </dataUrl>
    <settingUrl>
        <Item>http://vprinter.com/VP8CH67YXF42BBF2TQ449H8XA              ─ 1104
            /setting/5846759561318635695</Item>
    </settingUrl>
</PrintJob>
```

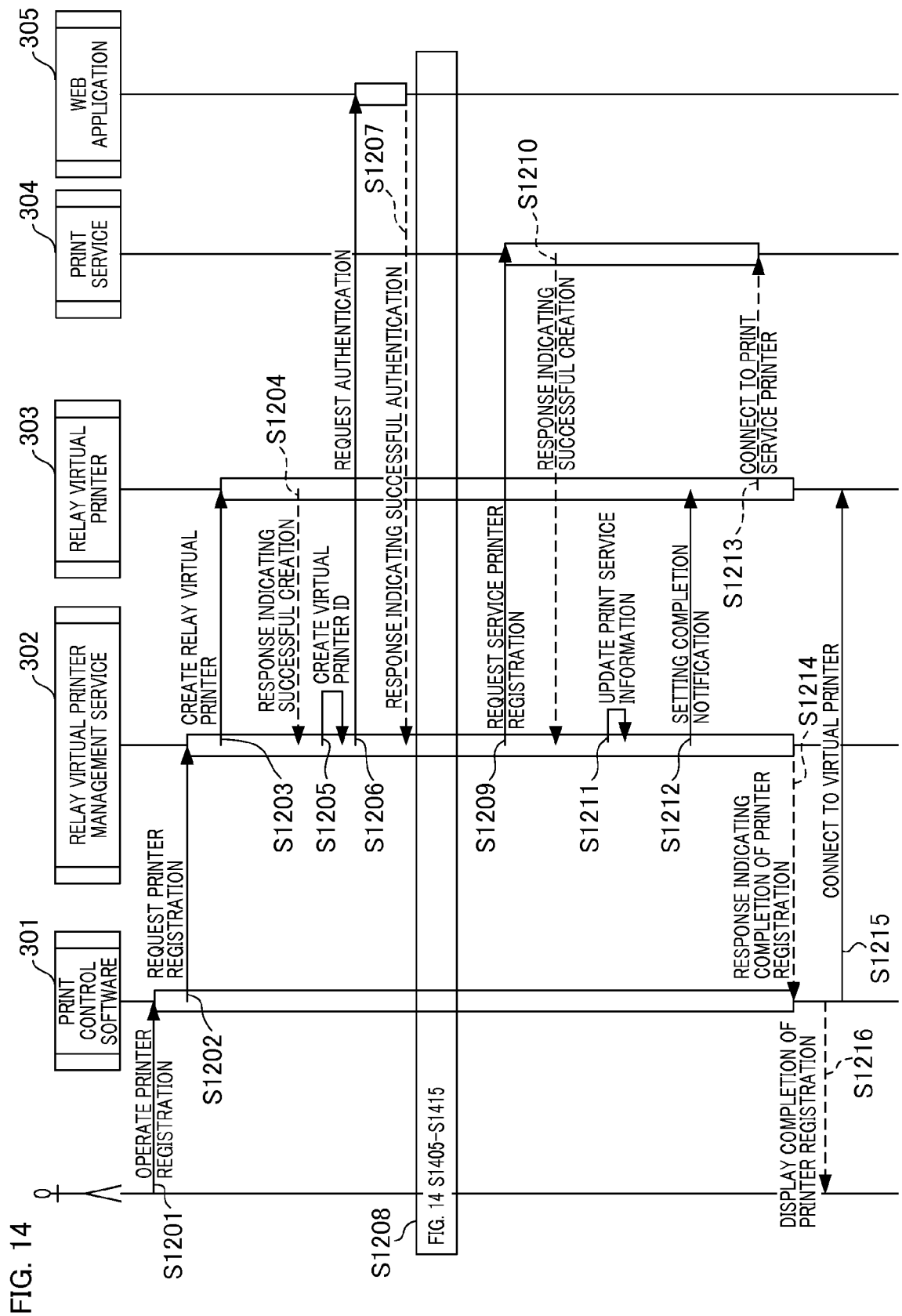

RELAY SERVER, RELAY SERVER CONTROL METHOD, AND STORAGE MEDIUM

BACKGROUND OF THE INVENTION

1. Field of the Invention

The present invention relates to a relay server, a relay server control method, and a storage medium.

2. Description of the Related Art

A content print system in which a print instruction is transmitted from a client to a server and the server received the print instruction converts the content to be printed into print data has been proposed. A cloud computing attracting attention is also one of system configurations for providing service from a server to a client.

As described above, there has conventionally been known a configuration in which a Web server provides a service to a client. A cloud computing attracting attention in recent years is also a configuration in which a Web server provides a service to a client. A main feature of the cloud computing is that data conversion and data processing are executed in a distributed manner using many computing resources so as to process requests from many clients in a simultaneous manner. At present, too many vendors provide various types of services by realizing Web services on a cloud computing environment for implementing the cloud computing in a disorderly way.

Among vendors who provide services on a cloud computing environment, Google (registered trademark) is a notable vendor. Google (registered trademark) not only establishes many large-scale data centers but also develops a data communication structure between devices and services so as to provide services in cooperation with devices. For example, Google (registered trademark) has developed a data communication structure for providing services in cooperation with image forming devices and has disclosed an interface for providing data communication between the cloud computing environment prepared by Google (registered trademark) and image forming devices. In this system, the image forming device receives a print request from a service and executes printing.

Japanese Patent Laid-Open No. 2003-196054 discloses a system in which a client that has received a print request transmits client information and a print data generation request to a server and the server acquires print control information corresponding to client information to thereby generate print data.

There has been proposed a general-purpose print service provided by a cloud computing vendor. It is contemplated that a print service device for providing the print service transmits a print setting screen generated based on printer information to a user device. The print setting screen includes, for example, printer names that are selectably displayed, and a user can designate a printer (image forming device) serving as a print output destination by selecting the corresponding printer name.

In the future, there will be an increasing opportunity for device vendors to provide services in cooperation with image forming devices in accordance with the interface disclosed by the cloud computing vendor. Thus, each device vendor wishes to implement a unique function in a service to be provided to differentiate it from other vendors. However, the general-purpose print service provided by the cloud computing vendor has low affinity for the image forming devices. For example, a print service device may not support the function (status display function) that provides the status display of an image forming device. In this case, the print service device cannot transmit a print setting screen including information indicating the status of an image forming device to a user device. Thus, a user cannot know the status of the image forming device, resulting in difficulty in determining whether or not the image forming device is printable.

SUMMARY OF THE INVENTION

The present invention provides a print system that transmits a print setting screen including information indicating the status of an image forming device to a user device even if a print service device does not support the function of displaying the status of the image forming device.

According to an aspect of the present invention, a relay server that is capable of communicating with a print service server that generates a print job based on print settings set by a user via a print setting screen displayed on a user device and transmits the generated print job to a printer is provided that includes a status acquisition unit configured to acquire status information of a printer; and an update unit configured to add a status name indicating the acquired status information to a printer name of the printer and update a printer name in printer information corresponding to the printer managed by the print service server with the printer name to which the status name has been added. The print service server includes a management unit configured to manage printer information undated with the printer name to which the status name has been added; and a transmission unit configured to generate a print setting screen, on which the printer name to which the status name has been added is to be displayed, based on the printer information managed by the management unit and transmit the generated print setting screen to the user device.

Further features of the present invention will become apparent from the following description of exemplary embodiments with reference to the attached drawings.

BRIEF DESCRIPTION OF THE DRAWINGS

FIG. 6 is an exemplary functional block diagram illustrating a relay virtual printer.

FIG. 7 is an exemplary functional block diagram illustrating a print service.

FIGS. 8A to 8C are diagrams illustrating information to be stored in devices constituting a print system.

FIG. 9A is a diagram illustrating the status of an image forming device.

FIG. 9B is a diagram illustrating display language information.

FIGS. 11A to 11C are diagrams illustrating an exemplary display screen to be displayed by a Web browser.

FIGS. 12A and 12B are diagrams illustrating an exemplary display screen to be displayed by a Web browser.

FIGS. 13A to 13D show information represented in XML format.

FIG. 14 shows processing for registering a relay virtual printer in a print service.

DESCRIPTION OF THE EMBODIMENTS

Figure 1:
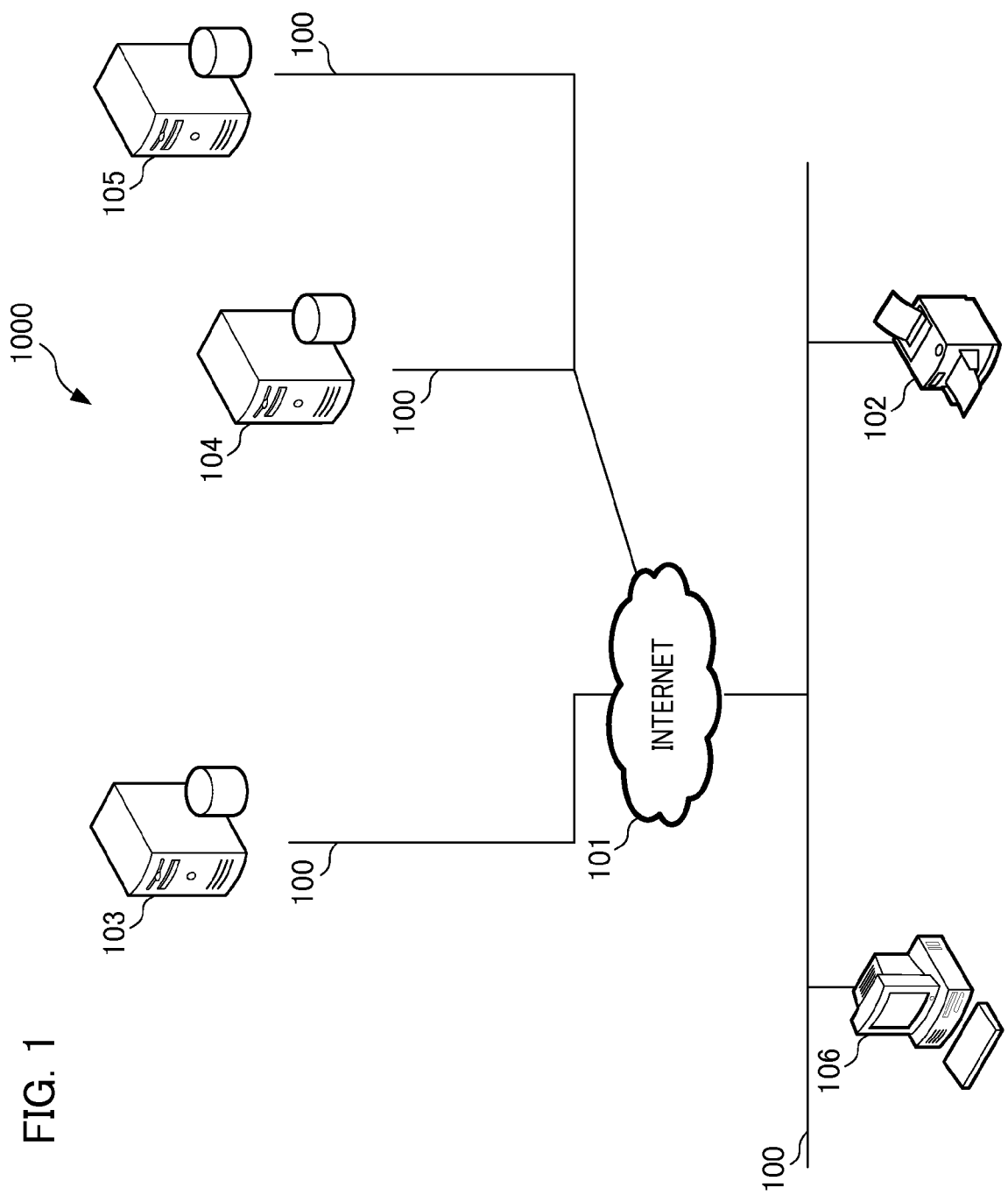
FIG. 1 is a diagram illustrating an example of the configuration of a print system according to a first embodiment.

A system including a relay server that is capable of communicating with a print service device that provides a print setting screen to a user device and transmits a print job, which corresponds to print settings set by a user on the print setting screen, to an image forming device may be conceived. Here, as described above, a print service device that provides a general-purpose print service has low affinity with an image forming device so that the print service device may not provide the status of the image forming device. For displaying the status of the image forming device, it is generally necessary to acquire status information indicating the status of the image forming device in advance through bidirectional communication with the image forming device.

However, in order to acquire status information about the image forming device by a print service device or a relay server in the Internet environment, the following processing becomes necessary. In other words, a communication session needs to be established among an image forming device, a relay server, and a print service device at all times or polling is required from an image forming device, resulting in a load on a relay server or a print service device. Thus, it is contemplated that a print service device that does not support the status display function is used. However, when the print service device does not support the status display function, the print service device cannot transmit a print setting screen including information indicating the status of the image forming device to a user device as described above. Thus, a user cannot confirm the status of the image forming device upon printing, and thus, the user cannot execute printing or is unaware of whether or not printing has been executed.

Even in a general-purpose print service device, the function of displaying the list of image forming devices on a user device in the format of printer names is typical. Hence, when the print service device does not support the function of displaying the status of the image forming device, it is contemplated that the print relay server provided by the vendor executes the following processing. In other words, the print relay server adds a status name to the printer name of a printer managed by itself, and transmits the printer name to which the status name has been added to a user device via a print service device.

However, the print relay service cannot detect the status of the image forming device not managed by the print relay server provided by its own company, i.e., the status of the image forming device which is another company's product. Thus, a print service cannot provide the status of the image forming device which is another company's product on the print setting screen of a user device.

Even if the general-purpose print service device can provide the list of image forming devices on a screen in the format of status name, the character strings may be displayed incorrectly when the status name is created by a language other than the display language set by a user who uses the general-purpose print service.

Also, after the image forming device becomes unavailable while being incapable of providing a status change notification to a print service device, the status display on the screen of the list of image forming devices may not be updated while being left in its normal state. If the print service device receives a print instruction from a user device in this case, the print service device cannot perform print processing and the user is unaware of whether or not desired printing could be executed. According to the information processing system of the present embodiment to be described below, the aforementioned circumstance can be avoided.

First Embodiment

FIG. 1 is a diagram illustrating the configuration of a print system 1000. The print system 1000 includes a client computer 106 and an image forming device 102. The client computer 106 and the image forming device 102 are devices that are arranged on a user environment and is communicably connected to each other via a network 100. The network 100 is connected to Internet 101.

Also, the print system 1000 includes a Web application server group 105 and a print server group 104. Both server groups may also be server groups provided by the same vendor. In this case, both server groups may also be connected to each other via the network 100. The print system 1000 also includes a print relay server 103. The print relay server 103 is connected to the network 100 and the network 100 is connected to the Internet 101. In the present embodiment, the image forming device 102 and the print relay server 103 collectively function as an information processing device that communicates with a print service. Devices and server groups constituting the print system 1000 are connectable to each other via the Internet 101 and can perform data communication with each other. The number of devices is only one shown in FIG. 1, but may be in plural. The number of server groups is in plural, but may be one. In the present embodiment, the print relay server 103 is referred to as a single server and the print server group 104 and the Web application server group 105 are referred to as a plurality of servers irrespective of the number of servers.

The Web application server group 105 provides a Web application for creating content data to a client and stores the content data created by the client using the provided Web application. The print server group 104 provides the print data generated based on the content data stored in the Web application server group 105 to a transmission destination. The image forming device 102 has a print unit that performs printing based on print data. Also, when there is any change in the status of the image forming device 102 itself, the image forming device 102 notifies the print relay server 103 or the print server group 104 of the status via the Internet 101. The print relay server 103 acquires print data to be provided to the transmission destination from the print server group 104 or the Web application server group 105.

Figure 2:
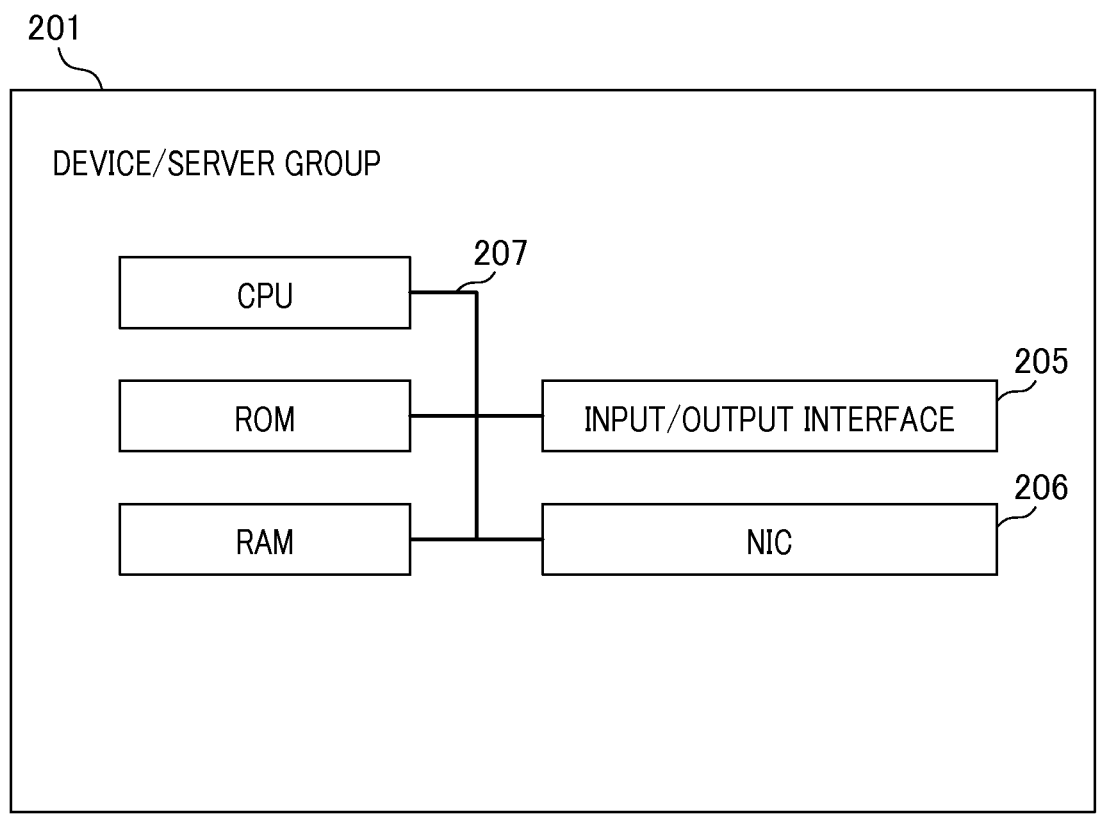
FIG. 2 is a diagram illustrating the hardware configuration of each device and each server group constituting a print system.

FIG. 2 is a diagram illustrating an example of the hardware configuration of each device and each server group constituting the print system 1000. Reference numeral 201 denotes each device and each server group constituting the print system 1000. A CPU (Central Processing Unit) 202 is a unit that executes various programs and realizes various functions. A ROM (Read Only Memory) 203 is a unit that stores various programs. A RAM (Random Access Memory) 204 is a storage unit that functions as a temporal working storage region for the CPU 202. The CPU 202 loads a program stored in the ROM 203 into the RAM 204 to thereby execute the program.

An Input/Output interface 205 transmits data to a display (not shown) connected to each device and each server group.

Also, the Input/Output interface 205 is an interface unit that receives data from a pointing device (not shown). An NIC (Network Interface Card) 206 is a unit that connects the devices and server groups constituting the print system 1000 to the network 100. The aforementioned units can perform reception/transmission of data via a bus 207. Also, the image forming device 102 includes a print unit (not shown). The print unit can receive/transmit data from/to the units via the bus 207. The print unit is a unit that can print a raster image on a recording medium.

Figure 3:
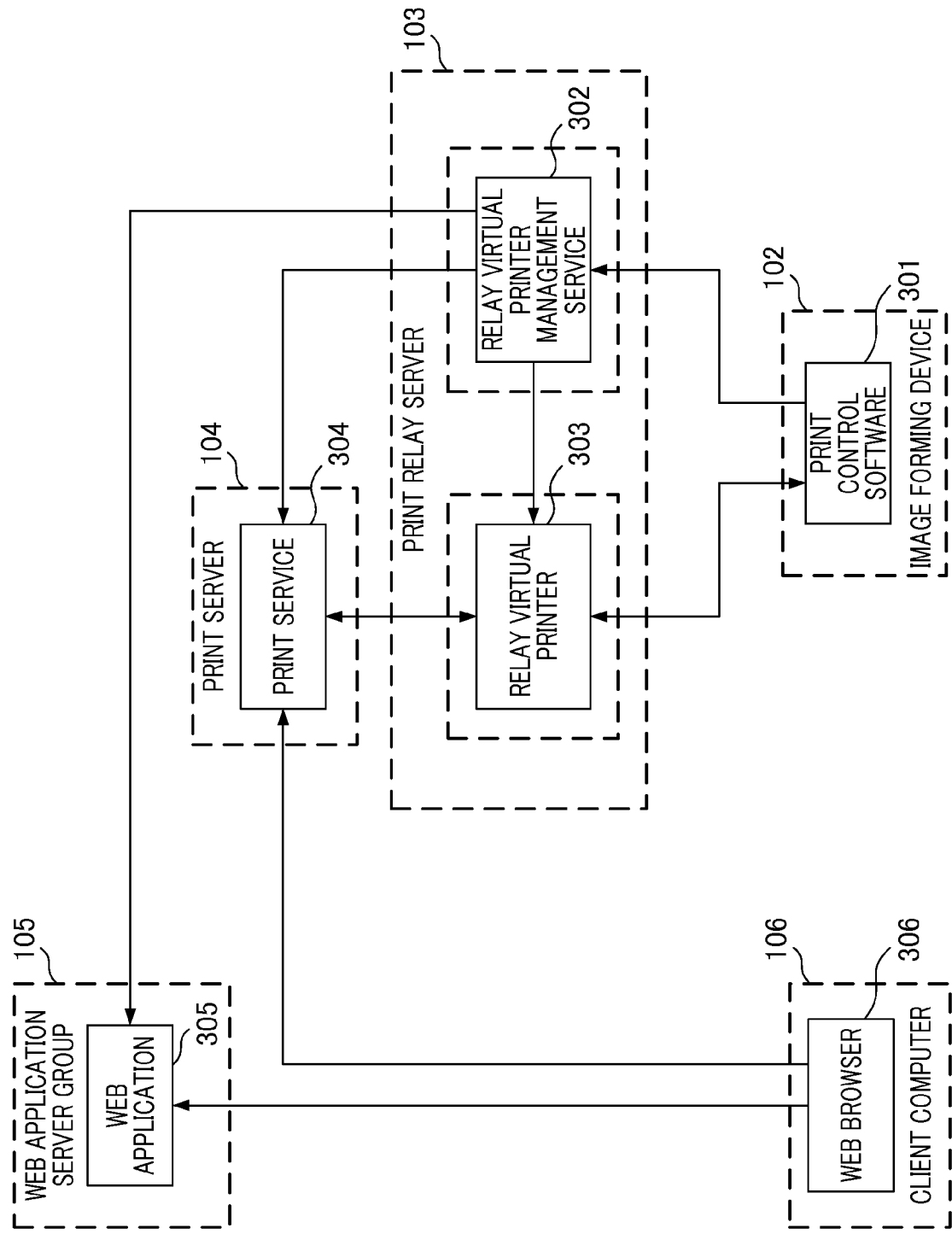
FIG. 3 is a diagram illustrating the software configuration of each device and each server group constituting a print system.

FIG. 3 is an exemplary functional block diagram illustrating devices and server groups constituting the print system 1000. Programs for realizing the functions of software shown in FIG. 3 are stored in the ROMs 203 of the devices and server groups. The functions are realized by the fact that the CPU 202 loads programs into the RAM 204 and executes the programs.

Hereinafter, a description will be given of the functions provided by the devices and server groups. The functions to be described below are classified as the following three groups. The function classified as a first group is a function classified as a registration function that registers the image forming device 102 in the print relay server 103 and realizes a relay virtual printer 303 within the print relay server 103 to thereby register the relay virtual printer 303 in a print service 304.

The function classified as a second group is a function classified as a print function that firstly transmits the content data generated by the Web application server group 105 to the print server group 104 and then causes an image forming device to print out print data based on a print notification transmitted from the print server group 104. When the print function causes the image forming device 102 to print out print data based on the print notification information transmitted from the print server group 104, the print server group 104 transmits a print notification to the image forming device 102 via the print relay server 103 serving as an intermediary.

The function classified as a third group is a function classified as a status update function in which the image forming device 102 firstly notifies the print relay server 103 of status information upon changes in the status of the image forming device 102, the print relay server 103 then notifies the print server group 104 of the status information and causes the print server group 104 to update the status of the image forming device 102, and the print relay server 103 updates a printer name held by the print server group 104 with a printer name to which the status information has been added as the designation of the image forming device 102. The print server group 104 causes a Web browser 306 to display the printer name.

Figure 10A:
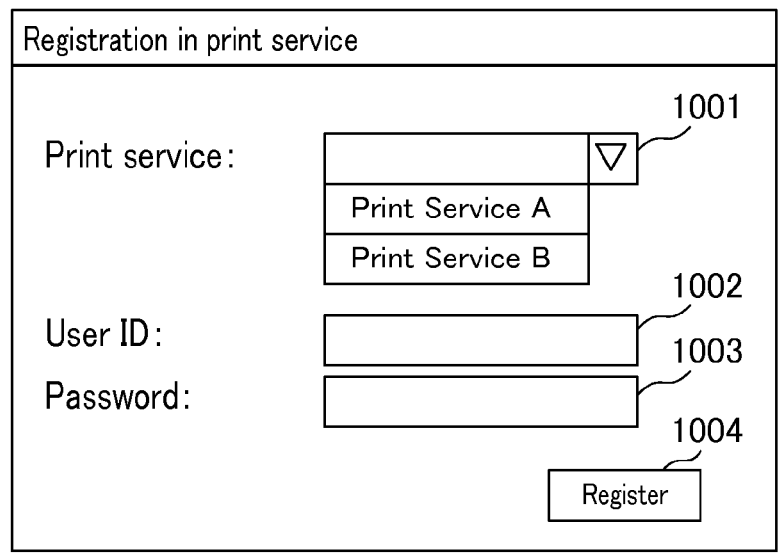
FIGS. 10A and 10B are diagrams illustrating an exemplary display screen to be displayed by a Web browser.

Firstly, a description will be given of the function classified as the registration. A description will be given of the function classified as the registration provided in the image forming device 102. The image forming device 102 has print control software 301. The print control software 301 realizes the functions shown in FIG. 4. More specifically, the print control software 301 includes a display unit 401, a print service information holding unit 402, and a registration unit 403. The display unit 401 displays various screens. The print service information holding unit 402 has information about the print service 304. FIG. 8A shows information about a print service. Although information about a plurality of print services is shown in FIG. 8A, the print service 304 according to the first embodiment corresponds to a Print Service A. When the processing for registering the image forming device 102 in the print service 304 is instructed from a user, the display unit 401 generates and displays the UI for registration in a print service as shown in FIG. 10A based on information shown in FIG. 8A. On the screen shown in FIG. 10A, a user selects a print service in which the image forming device 102 is desired to be registered from a button 1001.

In the case of the first embodiment, there is only one print service, i.e., the print service 304, a user has no choice but to select the Print Service A. The user inputs a user ID 1002 and a password 1003 to the selected print service 304.

Next, the user pushes a registration button 1004. The registration unit 403 issues registration information in response to the pressing of the registration button 1004 by the user. In the first embodiment, there is only one print service, i.e., the print service 304. When a plurality of print services is selectable, a user ID and a password can be separately set to each print service. Also, the registration unit 403 transmits the issued registration information to a request reception unit 501 provided by a relay virtual printer management service 302 to be described below. The other functions which have not previously been described will be described below.

Here, a description will be given of registration information. Registration information includes a print service name. The print service name is information for specifying a print service selected by a user. In other words, the print service name is information for specifying the print service 304 provided in the print server group 104. Also, registration information includes a user ID and a password. The user ID and the password are information required for utilizing the print service 304 and the Web application server group 105. The user ID and the password are referred to as "user information". In the present embodiment, it is assumed that the Web application server group 105 and the print server group 104 are provided by the same vendor. Thus, when a user uses services provided by both server groups, the user can use both services using the same user information. In the first embodiment, it is assumed that a user has already registered user information in the Web application server group 105 in advance.

Also, registration information includes an RPID (Real Printer ID) that is unique identification information assigned to the image forming device 102. Unique identification information is assigned to each image forming device (not shown) including the image forming device 102, and thus, each image forming device is specified by unique identification information. In the first embodiment, the location for placement of each image forming device can be specified by specifying the RPID. Also, registration information includes Printer Kind that is device model information about the image forming device 102. The identical device model information is assigned to the devices of the same kind. When two image forming devices are the devices of the same kind, it refers to the fact that two image forming devices incorporate the same the communication module B'. A detailed separate description will be given below of the communication module B', a communication module A, a communication module A', and a communication module B.

Also, registration information includes status information (status information 901) about each image forming device upon registration. As the examples of status, the types of the status are shown in FIG. 9A. Furthermore, registration information includes the printer name of the image forming device 102. The printer name is a name that is assigned to the image forming device 102 and is used for designating the image forming device 102. Unlike identification information, the image forming devices may have the same printer name.

Also, registration information includes capabilities. Capabilities are information indicating the capability of the image forming device 102. Capabilities include, for example, information indicating whether or not the image forming device 102 can perform duplex printing, information indicating whether or not the image forming device 102 can perform color printing, and information about the size of a paper sheet which can be output. Capabilities are the print function of the image forming device 102. Also, capabilities are transmitted to the request reception unit 501 in XML format as shown in FIG. 13A. Each parenthesis <Item> shown in FIG. 13A indicates the capability of the image forming device 102. In this example, it is indicated that the image forming device 102 can perform imposition printing, color printing, and can output sheets of paper with the size of B5, A4, and A3.

Figure 5:
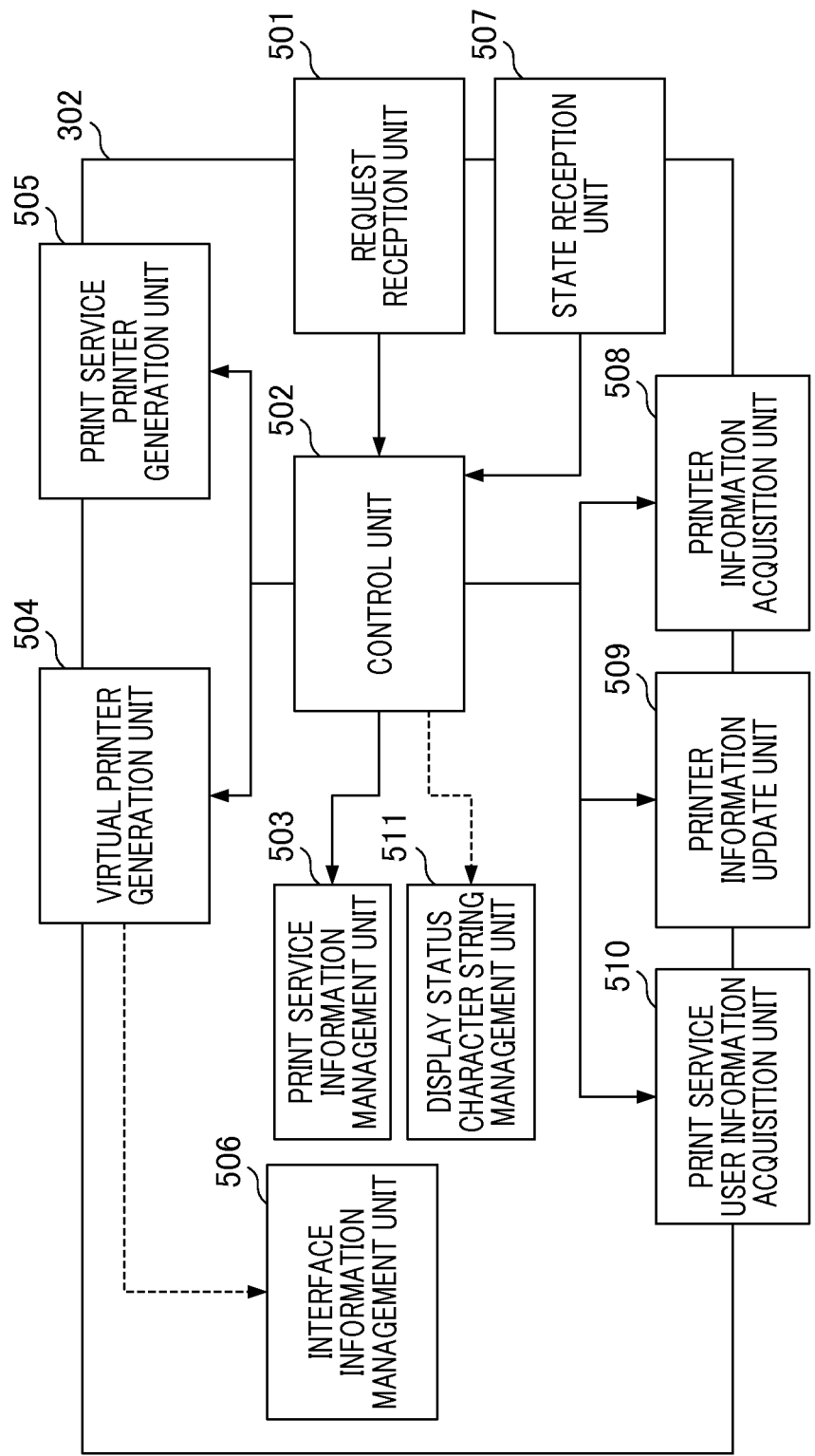
FIG. 5 is an exemplary functional block diagram illustrating a relay virtual printer management service.

Next, a description will be given of the function classified as the registration provided by the print relay server 103. The print relay server 103 has the relay virtual printer management service 302. FIG. 5 is a functional block diagram illustrating the relay virtual printer management service 302. The relay virtual printer management service 302 includes a request reception unit 501, a control unit 502, a print service information management unit 503, a virtual printer generation unit 504, a print service printer generation unit 505, and an interface information management unit 506. The request reception unit 501 receives registration information. The control unit 502 can acquire registration information received by the request reception unit 501 and interpret the registration information. Then, the control unit 502 provides instructions to the virtual printer generation unit 504 and the print service printer generation unit 505 to perform the following two processes. The first process is a process for realizing the function of the relay virtual printer 303 by the virtual printer generation unit 504. The second process is a process for registering information about the relay virtual printer 303 in the print service 304 by the print service printer generation unit 505. Note that a solid arrow indicates execution/writing processing and a dashed arrow indicates reading processing throughout the drawings A description will be given of the first process, that is, the process for realizing the function of the relay virtual printer 303 by the virtual printer generation unit 504. The relay virtual printer 303 realizes the functions shown in FIG. 6, and the details of which will be described below. The virtual printer generation unit 504 specifies and acquires a communication module B 602 stored in the interface information management unit 506 based on Printer Kind transmitted from the control unit 502. Also, the virtual printer generation unit 504 specifies and acquires a communication module A' 601 stored in the interface information management unit 506 based on the print service name. The communication module B is a module that performs communication with the image forming device 110. Since the devices of the same model have the same communication module B as described above, the devices of the same model can specify the communication module B from Printer Kind. The communication module B communicates with a communication module B' 411 provided by the print control software 301. The communication module A' 601 is a module that performs communication with the print server group 104, and is a module that can communicate with a communication module A 710 provided by the print service 304. The virtual printer generation unit 504 that has acquired two or more communication modules realizes a process (thread) into which two or more communication modules have been loaded. The process corresponds to the relay virtual printer 303.

The virtual printer generation unit 504 realizes the relay virtual printer 303, and then issues a VPID (Virtual Printer ID) that is identification information for identifying the realized relay virtual printer 303. The virtual printer generation unit 504 transmits the issued VPID to the control unit 502. The relay virtual printer 303 is realized each time the registration information is transmitted from the image forming device 102. The VPID, i.e., a unique identifier, is assigned to each of the realized relay virtual printers 303. In the first embodiment, a print job notification unit 608 can specify the location for placement of the relay virtual printer 303 by specifying VPID.

Next, a description will be given of the second process, that is, the process for registering information about the relay virtual printer 303 in the print service 304 by the print service printer generation unit 505. The control unit 502 transmits user information to the print service printer generation unit 505. In order to use the print server group 104, the print service printer generation unit 505 authenticates the Web application server group 105 based on the received user information. When the authentication is successful, the print service printer generation unit 505 transmits a printer name, capabilities, a VPID, and the status of the image forming device 102 to the print service 340. At this time, the control unit 502 creates a printer name to which the status of the image forming device 102 has been added with respect to the printer name transmitted from the image forming device 102, and transmits the printer name to the print service 304. The detailed description of the creation of a printer name will be given in the section of the status update function classified as the third group to be described below.

The print service printer generation unit 505 receives a SPID (Service Printer ID) as a response from the print service 304. The details of SPID will be described below. The control unit 502 acquires VPIDs and SPIDs from the virtual printer generation unit 504 and the print service printer generation unit 505, respectively. The control unit 502 that has acquired the VPIDs and SPIDs instructs the print service information management unit 503 functioning as a management unit to store the information. The print service information management unit 503 associates VPIDs, SPIDs, and registration information with each other and stores them as shown in FIG. 8B.

Reference numerals 801, 802, 803, and 804 correspond to VPID, print service name, RPID, and Printer Kind, respectively. Also, reference numerals 805, 806, 807, 808, 809, 810, and 811 correspond to SPID, printer name, status, status update time, capabilities, user name, and password, respectively. The print service information management unit 503 stores the status information 901 acquired from the image forming device 102 as registration information in the status 807. Also, the print service information management unit 503 stores a user ID and a password acquired from the image forming device 102 as registration information in the user ID 810 and the password 811, respectively. The status update time 808 will be described below.

Next, a description will be given of the function classified as the registration provided by the print server group 104. The print server group 104 has the print service 304. The print server group 104 virtualizes a plurality of servers as a single server, and realizes the function of the print service 304 by means of the single server. The print server group 104 activates a plurality of virtual machines in the single server, and causes each virtual machine to realize the function of the print service 304. The print service 304 shown in FIG. 3 is just one of them.

FIG. 7 is a functional block diagram illustrating the print service 304. The print service 304 includes a printer information registration unit 701, a printer information storage unit 702, a printer information presentation unit 703, a print instruction reception unit 704, a print data acquisition unit 705, and a control unit 706. The printer information registration unit 701 receives user information from the print service printer generation unit 505. The printer information registration unit 701 performs authentication using the Web application server group 105. If the authentication is successful, the printer information registration unit 701 receives user information from the Web application 305. User information includes the user ID of the print service 304. The printer information registration unit 701 receives a printer name, capabilities, status, and a VPID from the print service printer generation unit 505, and instructs the printer information storage unit 702 to store them together with the user ID.

Also, the printer information registration unit 701 issues an SPID corresponding to the VPID, and transmits the issued SPID to the printer information storage unit 702 and the print service printer generation unit 505. The printer information storage unit 702 function as a management unit and stores the user ID, the SPID, the printer name, the capabilities, the status, and the VPID that are brought into association with each other. FIG. 8C is a diagram illustrating information stored in the printer information storage unit 702, where reference numerals 812, 813, 814, 815, 816, and 817 correspond to user ID, SPID, printer name, capabilities, status, and VPID, respectively. The other functions which have not previously been described will be described below. As described above, a description has been given of the function classified as the registration that registers the image forming device 102 in the print relay server 103 and realizes the relay virtual printer 303 within the print relay server 103 to thereby register the relay virtual printer 303 in the print service 304.

Next, a description will be given of the function classified as the print. Firstly, a description will be given of the function provided by the client 106. The client 106 has the Web browser 306. The Web browser 306 transmits a print instruction for the content stored in the Web application server group 105 to the Web application server group 105. Also, the Web browser 306 receives a command (i.e., redirect instruction) for accessing the print server group 104 from the Web application server group 105, and accesses the print server group 104 in accordance with the received redirect instruction. Also, the Web browser 306 acquires a list of image forming devices that are printable by a user who is using the Web browser 306 from the accessed print server group 104 and displays the list.

Figure 10B:
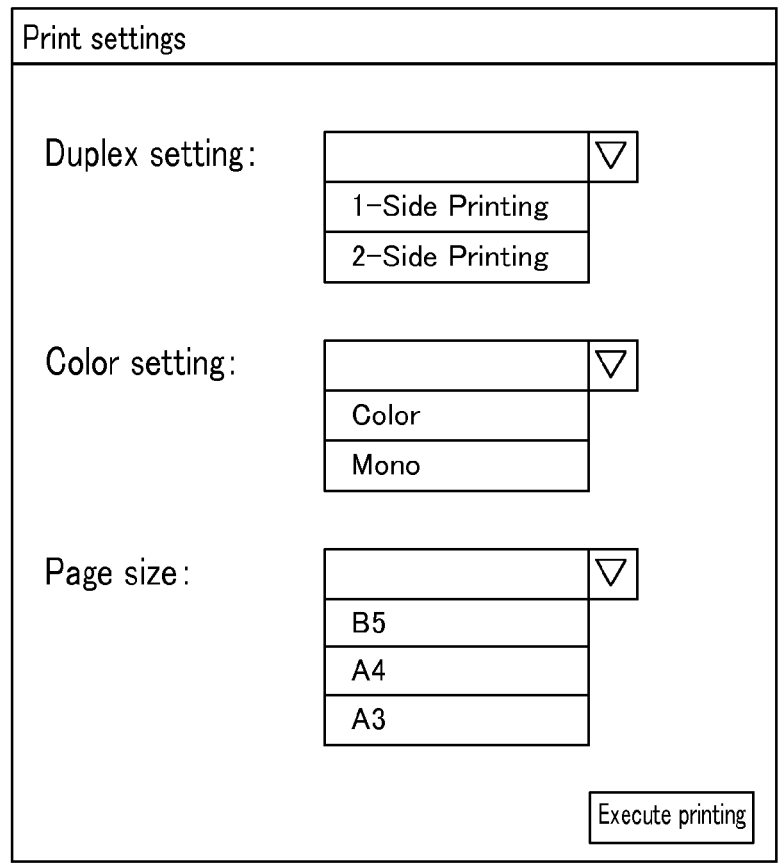

FIG. 11A shows the list of printable image forming devices, to which print settings are made by a user, to be displayed by the Web browser 306. The Web browser 306 acquires a print setting screen, which corresponds to the image forming device selected from the list by the user, from the print server group 104 and displays the print setting screen. FIG. 10B shows a print setting screen corresponding to the image forming device, which is displayed by the Web browser 306, selected by a user. Also, the Web browser 306 transmits print setting values set by a user on the print setting screen to the print server group 104. The above description has been given of the Web browser 306 provided by the client 106.

Next, a description will be given of the function provided by the Web application server group 105. The Web application server group 105 has the Web application 305. The Web application server group 105 virtualizes a plurality of servers as a single server, and realizes the function of the Web application 305 by means of the single server. The Web application server group 105 activates a plurality of virtual machines in the single server, and causes each virtual machine to realize the function of the Web application 305.

The Web application 305 provides a Web service relating to document creation. When a user wishes to distribute a material at the company's meeting, the user uses a document creation service for creating the material. When the client 106 uses the Web application 305, there is no need to install the Web application 305 on the client 106 but the client 106 may only have the Web browser 306. The Web application 305 transmits screen information required for creating the material to the Web browser 306. The Web application 305 performs authentication based on user information including the user ID and the password both input by a user via the Web browser 306, and sends screen information required for creating a material in response to the success of authentication. The Web browser 306 that has received the screen information displays a creation screen for creating a document based on the screen information and a user creates a material to be distributed at the meeting using the creation screen.

The Web application 305 receives information about the material created by a user using the creation screen, creates a content based on the received information, and causes the storage device for the Web application server group 105 to store the created content. At this time, a user input the title of the content. Also, the created plurality of contents is stored, and thus, the titles of the contents may overlap. In such a case, content identification information for uniquely identifying content is assigned for each content data corresponding to each content, and content data is stored in various formats. Examples of such format include a typical word processor document, spreadsheet document, and presentation document, PDF (Portable Document Format) format, and HTML (Hyper Text Markup Language) format. Note that the Web application 305 provides not only a document creation service but also a mail service and a schedule service.

A user who wishes to print the content created by using a document creation service presses down a print button displayed on the creation screen. FIG. 11C shows the fact that a print button 1011 has been pressed down. Note reference numeral 1012 denotes the content created by a user. The Web application 305 receives information indicating that the print button 1012 has been pressed down, and transmits a command for accessing the print server group 104 (i.e., a redirect instruction) to the Web browser 306. Note that a redirect instruction includes a request for acquiring the list of image forming devices shown in FIG. 11A corresponding to a user who is using the Web browser 306 described above.

A redirect instruction also includes content identification information for identifying a content to which a print instruction has been given by a user, and user information. When the Web application 305 selects an image forming device by which a user wishes to execute printing from the list of image forming devices shown in FIG. 11A, the Web application 305 provides a print instruction to the print server group 104 together with user information. Also, when a print data acquisition request is made from the print server group 104, the Web application 305 transmits print data identification information for identifying print data to the print server group 104. In the present embodiment, print data is a content in PDF format. Thus, print data identification information is identification information relating to a content in PDF format.

As described above, the Web application 305 provides not only a document creation service but also a mail service and a schedule service. The content created by these services provided by the Web application 305 is available from a program or a service provided by a third party via the interface of the Web application 305. Since the Web application 305 holds content in various formats, a content can be acquired in various formats through the interface. The above description has been given of the Web application 305 provided by the Web application server group 105.

Next, a description will be given of the function classified as the print service provided by the print server group 104. The printer information presentation unit 703 of the print service 304 transmits the image forming device list screen as shown in FIG. 10B to the Web browser 306 in response to the request for listing image forming devices from the Web browser 306. The printer information presentation unit 703 specifies SPIDs and printer names stored in the printer information storage unit 702 based on user information (user ID). Then, the printer information provision unit 703 generates a list of image forming devices available for use by a user based on the SPIDs and the printer names.

Also, the printer information presentation unit 703 receives the SPID of an image forming device selected from the list by the user. The printer information presentation unit 703 specifies capabilities stored in the printer information storage unit 702 based on the received SPID, generates a print setting screen, and transmits the generated print setting screen to the Web browser 306. The printer information storage unit 702 generates the print setting screen shown in FIG. 10B based on information about capabilities shown in FIG. 13A. As shown in FIG. 10B, the printer information storage unit 702 generates a print setting screen in which only the print settings described in capabilities are selectable.

The print instruction reception unit 704 receives the print settings designated by the user via the print setting screen and the SPID from the Web browser 306. Also, when an access is made from the Web browser 306 based on the redirect instruction, the print instruction reception unit 704 receives print data identification information for identifying print data to which a print instruction has been given by a user.

The print data acquisition unit 705 receives print data identification information from the print instruction reception unit 704. Also, the print data acquisition unit 705 receives the print settings input by a user and the SPID corresponding to the image forming device selected by the user from the print instruction reception unit 704. The control unit 706 acquires the print data identification information, the print settings, and the SPID from the print data acquisition unit 705. The print settings are described in XML format as shown in FIG. 13B. Referring to FIG. 13B, it can be seen that the double-sided setting, the monochrome setting, and the paper size A4 are set by a user. The communication module A 710 can communicate with a device having the communication module A' 601 and is an interface for data communication between two devices. The communication module A' 601 communicates with the communication module A 710. The reason for this will be described after the description of the function provided by the communication module A 710.

The communication module A 710 of the print service 304 includes a print data identification information storage unit 707, a print setting storage unit 708, and a print job notification unit 709. The print data identification information storage unit 707 receives print data identification information from the control unit 706 and stores the received print data identification information. The print setting storage unit 708 receives print settings from the control unit 706 and stores the received print settings. The print data identification information storage unit 707 and the print setting storage unit 708 receive a storage instruction from the control unit 706 to thereby perform storage processing. The control unit 706 instructs the print job notification unit 709 to send notification information in response to the reception of an indication of the end of storage from the print data identification information storage unit 707 and the print setting storage unit 708.

The print job notification unit 709 acquires an SPID from the control unit 706 in response to the notification information transmission instruction from the control unit 706, and specifies a VPID based on information stored in the printer information storage unit 702. Information about the transmission destination corresponding to the SPID, i.e., the VPID of the transmission destination, is referred to as "target". In other words, a user specifies the VPID by selecting the SPID. Also, the print job notification unit 709 acquires the storage location of print data and the storage location of print settings from the control unit 706, generates notification information A, and transmits the notification information A to the registered image forming device.

The print job notification unit 709 corresponds to a first transmission unit, and information to be transmitted by the print job notification unit 709 corresponds to information relating to data. In the first embodiment, the information relating to data is the notification information A. However, the information relating to data may also include other information, other data, or the like depending on the communication specification. The same applies to notification information B to be described below. Also in the first embodiment, the registered image forming device refers to the relay virtual printer 303 corresponding to the VPID. The notification information A is described in XML format as shown in FIG. 13C. Reference numeral 1101 indicates the description of the storage location of print data and reference numeral 1102 indicates the description of the storage location of print settings. Note that notification information is notification information that is transmitted by the print server so as to provide print data to a transmission destination and includes common information that is commonly given to both content data and print data. Common information will be described below but corresponds to "Doc1" described in the item <title> shown in FIG. 13C.

Here, a description will be given of the reason why the communication modules other than the communication module A' cannot communicate with the communication module A. This is because the communication modules other than the communication module A' cannot interpret the notification information A which is transmitted by the print job notification unit 709 and is described in XML format. Another reason why communication modules other than the communication module A' cannot communicate with the communication module A is given in the following example. For example, when the communication module A does not have the print job notification unit 709 and causes the communication module A' to acquire print data and print settings in another way, the communication module A' which acquires the notification information A cannot acquire print data and print settings. This is because, since the communication module A' which acquires the notification information A is in a state of waiting for the notification information A from the communication module A, the communication module A' cannot acquire print data and print settings unless the communication module A' is notified of the notification information A.

The communication module A' capable of communicating with the communication module A needs to have a query function for querying the communication module A to inquire whether or not data to be acquired is present. In this manner, there may also be a case where communication cannot be established between the communication module A and the communication module A' due to the fact that the communication module A' does not correspond to the data communication standard of the communication module A. A structure for enabling communication between the communication module A and the communication module A' is referred to as the "specification" of a vendor who provides the print server group 104. Then, the specification strongly depends on the vendor managing the print server group 104.

The vendor managing the print server group 104 discloses the communication module A' that communicates with the communication module A by implementing the communication module A in the print server group 104. In fact, such a system is being established in recent years and the vendor managing the print server group 104 discloses a proprietary specification for performing data communication between the print server group 104 and the device. In order to establish communication between the image forming device 102 and the print server group 104, the device vendor of the image forming device 102 must install the communication module A' on the image forming device 102. Assume that the vendor managing the print server group 104 changes the configuration of the communication module A. In other words, assuming that the vendor managing the print server group 104 changes the specification, the device vendor must change the communication module A' of the image forming device 102 in accordance with the changes in the specification. However, such an operation burden is very high. The reason for this is that image forming devices are arranged in various customer environments and thus service persons must visit various customer environments so as to change the communication module A' in order to establish communication between the print server group 104 and the image forming devices again.

Although another solution that distributes the communication module A' without using a service person may also be considered, such solution places a load on a communication band because the communication module A' must be distributed to a plurality of image forming devices. However, the possibility is solved by using the function classified as the print provided by the print relay server 103 to be described below. The specification for data communication disclosed by the vendor managing the print server group 104 corresponds to a first specification. The interface of the communication module A and the communication module A' is an interface that is generated in accordance with the first specification.

Next, a description will be given of the function classified as the print system provided by the print relay server 103. As shown in FIG. 6, the relay virtual printer 303 has the communication module A' 601 and the communication module B 602. The communication module A' 601 includes a print notification reception unit 603, a print setting acquisition unit 604, and a print data acquisition unit 605. The communication module B 602 includes a print job notification unit 608, a print setting storage unit 607, and a print data storage unit 606. The print notification reception unit 603 of the communication module A' 601 receives the notification information A transmitted from the print job notification unit 709. Since the relay virtual printer 303 is registered instead of the RPID of the image forming device 102 in the print service 304, the notification information A is transmitted to the print notification reception unit 603. Since the communication module A' is a module that is a one-to-one correspondence with the communication module A, the print notification reception unit 603 is capable of interpreting the notification information A. The print notification reception unit 603 corresponds to a first acquisition unit.

The print notification reception unit 603 confirms the storage location of print data and the storage location of print settings both described in the notification information A, and notifies the print setting acquisition unit 604 and the print data acquisition unit 605 of the information. The print setting acquisition unit 604 acquires print settings from the print setting storage unit 708 based on the notified storage location of print settings. The print data acquisition unit 605 acquires print data from the print data identification information storage unit 707 based on the notified storage location of print data.

The print data acquisition unit 605 instructs the print data storage unit 606 to store print data acquired by the print data acquisition unit 605. The print setting acquisition unit 604 instructs the print setting storage unit 607 to store the print settings acquired by the print setting acquisition unit 604. The print data storage unit 606 that has stored print data notifies the print job notification unit 608 of the storage location of print data. The print setting storage unit 607 that has stored the print settings notifies the print job notification unit 608 of the storage location of the print settings. The print job notification unit 608 generates the notification information B in response to the reception of the notification of the storage locations from the print data storage unit 606 and the print setting storage unit 607. The notification information B is described in XML format as shown in FIG. 13D. Reference numeral 1103 indicates the description of the storage location of print data, and reference numeral 1104 indicates the description of the storage location of print settings. The print job notification unit 608 transmits the notification information B to the print control software 301. The print job notification unit 608 corresponds to a second transmission unit. As described above, the communication module A' 601 serving as the former communication module passes print data and print settings to the communication module B 602 serving as the latter communication module to thereby realize communication between modules.

The image forming device 102 implements the communication module B' corresponding to the communication module B. The image forming device 102 acquires print data from the print service 304. With the aid of the aforementioned structure, even if the communication module A' changes in accordance with the change in the communication module A, notification information can be transmitted to the image forming device 102 by changing the communication module A' of the print relay server 103. In other words, even if the vendor managing the print server group 104 changes a proprietary specification for performing data communication between the print relay server 103 and the image forming device 102, there is no need for the device vendor to change the communication module of the image forming device 102. The device vendor can establish communication between the image forming device 102 and the print server group 104, which are arranged in various user environments, by changing the relay virtual printer 303 of the print relay system. As a method for changing the relay virtual printer 303, not only a method for changing the communication module A' of the relay virtual printer 303 but also a method for newly generating the relay virtual printer 303 by discarding the existing relay virtual printer 303 may be considered.

Figure 4:
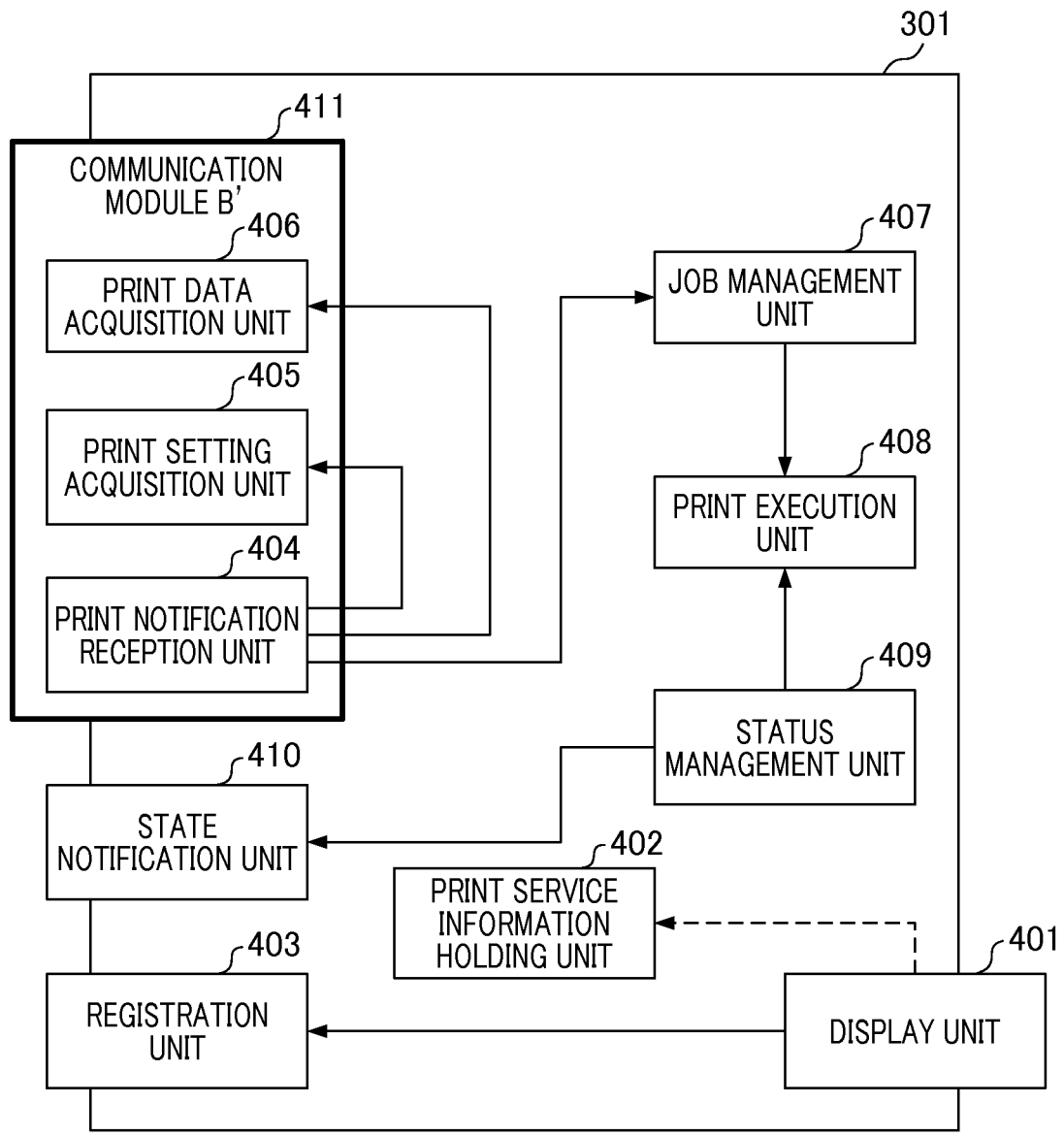
FIG. 4 is an exemplary functional block diagram illustrating print control software.

Next, a description will be given of the function classified as the print provided by the image forming device 102. As shown in FIG. 4, the print control software 301 has the communication module B' 411. The communication module B' 411 includes a print notification reception unit 404, a print setting acquisition unit 405, and a print data acquisition unit 406. The print notification reception unit 404 receives the notification information B transmitted from the print job notification unit 608. The print notification reception unit 404 corresponds to a second acquisition unit. Since the communication module B' 411 is a module that is a one-to-one correspondence with the communication module B 602, the print notification reception unit 404 is capable of interpreting the notification information B. The specification defined by a device vendor in order to perform data communication between the relay virtual printer 303 and the image forming device 102 corresponds to a second specification that can be handled by the device vendor. The interface of the communication module B and the communication module B' is an interface that is generated in accordance with the second specification.

The print notification reception unit 404 confirms the storage location of print data and the storage location of print settings both described in the notification information B and notifies the print setting acquisition unit 405 and the print data acquisition unit 406 of the information, respectively. The print setting acquisition unit 405 acquires print settings from the print setting storage unit 607 based on the notified storage location of print settings. The print data acquisition unit 406 acquires print data from the print data storage unit 606 based on the notified storage location of print data. The acquired print settings and print data are transmitted to a job management unit 407 via the print notification reception unit 404. The job management unit 407 acquires print data and print setting information and instructs a print execution unit 408 to execute printout. The instructed print execution unit 408 generates a raster image based on print settings and print data, and instructs a print unit to print the generated raster image. The above description has been given of the function classified as the print in which a print instruction of the content generated by the Web application server group 105 is transmitted to the print server group 104 and print data transmitted from the print relay server 103 is printed by the image forming device 102.

Next, a description will be given of the function classified as the status update provided by the image forming device 102. As shown in FIG. 4, the print control software 301 includes a status management unit 409 and a state notification unit 410. The status management unit 409 holds the status state of the image forming device 102. The status management unit 409 monitors the state of itself at all times and, if there is any change in the state, notifies the state notification unit 410 of the changed status information. The contents of status are the states represented by reference numeral 901 shown in FIG. 9A. Also, if there is any change in status during print processing and the changed status information is the following status content, the status management unit 409 instructs the print execution unit 408 to interrupt printing. More specifically, the status in which print processing cannot be continued is a status classified as an error. In other words, examples of the status 901 include "Paper Jam", "Over Open", "Out Of Toner", and "Error". Among the statuses 901, the status "Status Unknown" is a status in the case where the image forming device 102 and the print relay server 103 are incommunicable, and is determined by the print relay server 103.

Next, a description will be given of the function classified as the status update provided by the print relay server 103. The relay virtual printer management service 302 includes a state reception unit 507, a printer information acquisition unit 508, a printer information update unit 509, a print service user information acquisition unit 510, and a display status character string management unit 511. In response to the status information notification by the state notification unit 410 shown in FIG. 4, the state reception unit 507 of the relay virtual printer management service 302 receives the status information. At this time, the status information received by the state reception unit 507 includes the status and RPID. The state reception unit 507 notifies the control unit 502 of the status and RPID. Then, the control unit 502 notifies the print service information management unit 503 of the RPID. The print service information management unit 503 extracts information that matches the notified RPID from the management table shown in FIG. 8B and returns the extracted information to the control unit 502. When a plurality of users is present in the extracted information, i.e., a plurality of users is registered in the same image forming device 102, the following processing is performed for the number of a plurality of users.

Next, upon receiving the instruction from the control unit 502, the print service user information acquisition unit 510 authenticates the Web application server group 105 based on the user ID and the password included in the received information. When the authentication is successful, user information is received from the Web application 305. The user information includes an authentication token and display language information to be stored in the Web application 305. The display language information is information that is preset by a user who uses the service of the Web application 305 and indicates a display language for use when the screen created by the Web application 305 is displayed by the Web browser 306. As the types of the display language, examples include the languages represented by Language 902 shown in FIG. 9B, such as Japanese, English, French, German, and the like.

Next, the control unit 502 refers to the status character strings managed by the display status character string management unit 511 by using the display language information acquired from the Web application 305 and the status acquired from the print service information management unit 503. The control unit 502 acquires a status character string that matches the display language preset by a user. The character string is shown in a map represented by reference numeral 903 shown in FIG. 9B. The map 903 is constituted by character strings that represent the statuses for each language. In other words, the display status character string management unit 511 functions as a storage unit that stores correspondence information between a status name corresponding to the display language to be displayed by the Web browser 306 and a printer status in advance. The control unit 502 determines a display language based on the display language information.

Next, the control unit 502 passes the authentication token to the printer information acquisition unit 508. The printer information acquisition unit 508 acquires information about the list of printers linked to the user ID authenticated by the print server group 104 based on the authentication token. The processing performed by the print service 304 at this time will be described below.

The printer list information acquired from the print service 304 includes the list of SPIDs 813 shown in FIG. 8C managed by the printer information storage unit 702 of the print service 304. Here, the control unit 502 acquires all the information, which matches the user ID from among the management table shown in FIG. 8B managed by the print service information management unit 503, from the print service information management unit 503. The original user ID is a user ID that matches the RPID acquired from the image forming device 102.

Furthermore, information (a record having the SPID of "11F0A122-57B8" in FIG. 8C) that is not registered in the print service information management unit 503 is also extracted in the printer list information acquired from the print service 304. The information is printer information that is not managed by the relay virtual printer management service 302 with respect to the user ID. The control unit 502 acquires a printer name and a status as printer information from the print service 304 via the printer information acquisition unit 508 based on the SPID of the extracted information. The control unit 502 recreates a printer name by using the acquired printer information and adding a status character string to a printer name as shown in reference numeral 806 shown in FIG. 8. In other words, the control unit 502 functions as an update unit that updates a printer name in printer information managed by the print service 304. The control unit 502 temporarily deletes the existing status character string for the printer name and updates the printer name by adding a new status character string thereto.

The control unit 502 notifies the print service information management unit 503 of the recreated printer name and the status acquired from the image forming device 102, and the print service information management unit 503 updates the information and holds them in the management table shown in FIG. 8B. Also, the update time at which the status has been updated is held as a status update time 808. The status update time 808 will be described below in a third embodiment of the present invention. Furthermore, the control unit 502 transmits the authentication token, the recreated printer name, the status, and the SPID to the print server group 104 via the printer information update unit 509.

Next, a description will be given of the function classified as the status update provided by the print server group 104. The printer information presentation unit 703 of the print service 304 shown in FIG. 7 receives a printer list acquisition request from the printer information acquisition unit 508 of the relay virtual printer management service 302. The printer information presentation unit 703 acquires a user ID from the authentication token included in the acquisition request, and passes the user ID to the printer information storage unit 702 via the control unit. The printer information storage unit 702 extracts all the records that match a user ID 812 from the management table shown in FIG. 8C, and passes the list of SPIDs 813 and the list of printer names 814 to the printer information presentation unit 703. The printer information presentation unit 703 transmits the received lists to the printer information acquisition unit 508.

Also, the print service 304 includes a printer information update unit 711. When a printer information update request is made from the printer information update unit 509 of the relay virtual printer management service 302, the printer information update unit 711 receives the printer name, the status, the SPID, and the authentication token that have been recreated by the control unit 502 of the relay virtual printer management service 302. The printer information update unit 711 acquires a user ID from the authentication token, and passes information to the printer information storage unit 702. The printer information storage unit 702 updates the information included in the management table shown in FIG. 8C. In this way, the printer name held by the relay virtual printer management service 302 or the print service 304 can be updated to a printer name including printer status.

The above description has been given of the function classified as the status update that updates the status of the image forming device 102. In other words, when the status of the image forming device 102 changes, the image forming device 102 notifies the print relay server 103 of status information. Then, the print relay server 103 notifies the print server group 104 of status information, and the print server group 104 updates the status of the image forming device 102 held thereby. By means of the processing, the print service 304 can express status information of all printers registered in the print service 304 by a user in a format in accordance with the display language for the user on the list screen of image forming devices (service printers). The list screen is shown in FIG. 11A and FIG. 11B.

The printer list screen shown in FIG. 11A is an exemplary screen when the display language set by the Web application 305 is English. The printer list screen shown in FIG. 11B is an exemplary screen when the display language set by the Web application 305 is Japanese. For the status update function classified as the third group, a description has been given of the function that recreates a printer name including printer status at the timing at which the status of the image forming device 102 has changed to thereby update the printer name. The timing at which the status update function is executed is also performed during the registration function classified as the first group. The execution timing corresponds to step S1208 shown in FIG. 14 to be described below.

Next, a description will be given of the execution timing of status update with respect to the image forming device 102 which is not managed by the print relay server 103. The image forming device 102 which is not managed by the print relay server 103 is an image forming device that is directly registered only in the print server group 104, that is, an image forming device (an image forming device not having registration information in the management table shown in FIG. 8B) that is not registered in the print relay server 103. In the status update function, status update processing is performed for an image forming device which is not managed by the print relay server 103 as long as the image forming device is an image forming device registered in the print server group 104 by the user. The execution timing at which the status of the image forming device, which is not managed by the print relay server 103, is updated may also be set by the method in which the print relay server 103 notifies the print server group 104 of status update at a fixed interval at all times. Information can be updated in real time by performing status update processing at a fixed interval at all times. However, in the method, the print relay server 103 communicates with the print server group 104 at a fixed interval at all times even if there is no change in status, and thus, unwanted processing may be executed, resulting in an unwanted communication load on the print server group 104. In consideration of the above, a description has been given of the first embodiment by taking an example in which status update processing (processing for adding a status to a printer name) for updating the status of the image forming device, which is not managed by the print relay server 103, upon registration of the image forming device or at the timing at which the status of the image forming device changes. In the second embodiment to be described below as another embodiment, a description will be given of a method for performing status update processing at any execution timing specified by a user.

Next, a description will be given of processing for registering the image forming device 102 in the print relay server 103 and realizing the relay virtual printer 303 within the print relay server 103 to thereby register the relay virtual printer 303 in the print service 304.

Firstly, in step S1201, a user selects a print service desired to be registered from the display unit 401 of the image forming device 102 and inputs a user ID and a password. In step S1202, the registration unit 403 of the print control software 301 requests the request reception unit 501 of the relay virtual printer management service 302 to register a printer. At this time, the registration unit 403 of the print control software 301 transmits the registration information, RPID, Printer Kind, Capabilities, printer name, and status to the request reception unit 501.

In step S1203, the control unit 502 of the relay virtual printer management service 302 receives the registration information from the request reception unit 501. The control unit 502 instructs the virtual printer generation unit 504 to realize the relay virtual printer 303 based on the received registration information. In step S1204, the relay virtual printer 303 transmits a response indicating a successful creation to the virtual printer generation unit 504. In step S1205, the virtual printer generation unit 504 creates a VPID.

In step S1206, the print service user information acquisition unit 510 that has received the instruction from the control unit 502 transmits the user ID and the password to the Web application 305 to thereby receive authentication. When the authentication performed by the Web application 305 was successful, the Web application 305 transmits the response indicating successful authentication to the control unit 502 in step S1207. In step S1208, the relay virtual printer management service 302, the Web application 305, and the print service 304 execute status update processing from steps S1405 to S1415 to be described below with reference to FIG. 16. In step S1209, the print service printer generation unit 505 of the relay virtual printer management service 302 requests the printer information registration unit 701 of the print service 304 to register the VPID as a printer (service printer) provided to the user. In step S1210, the printer information registration unit 701 issues an SPID in response to the registration of the VPID as a service printer, and transmits the SPID to the print service printer generation unit 505.

In step S1211, the control unit 502 of the relay virtual printer management service 302 instructs the print service information management unit 503 to store the SPID and VPID. In step S1212, the setting completion notification and the SPID are transmitted to the relay virtual printer 303. In step S1213, the relay virtual printer 303 is connected to the communication module A 710 of the print service 304 based on the SPID, and waits for the notification information A to be transmitted. In step S1214, the request reception unit 501 of the relay virtual printer management service 302 notifies the registration unit 403 of the print control software 301 of the fact that the printer registration has been completed. In step S1215, the registration unit 403 instructs the display unit 401 to display the fact that the image forming device registration has been completed on the UI of the image forming device 102. In step S1216, the print control software 301 is connected to the communication module B of the relay virtual printer 303 based on the VPID, and waits for the notification information B to be transmitted. The above description has been given of registration processing.

Figure 15:
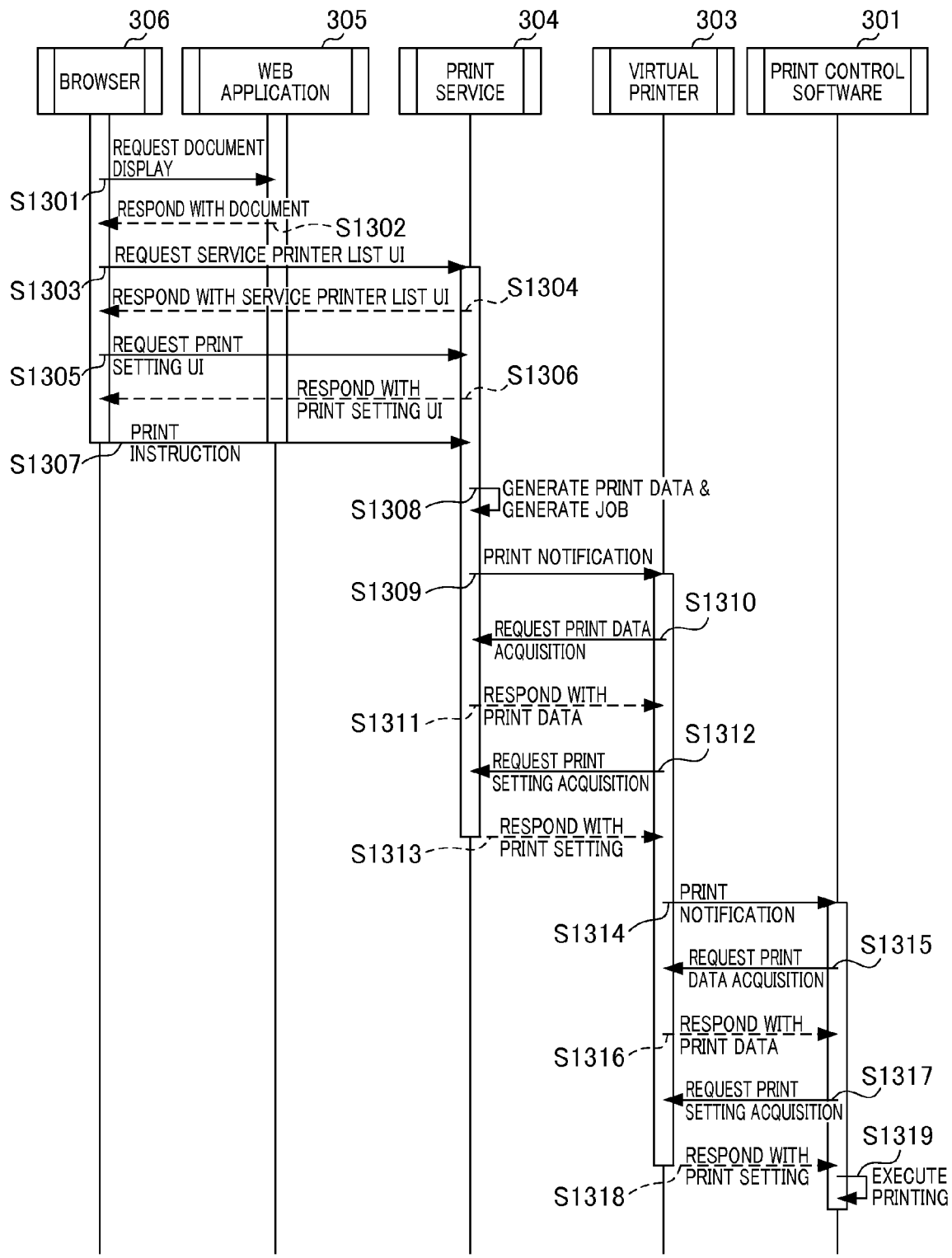
FIG. 15 shows processing for causing an image forming device to print out print data after a print instruction.

Next, a description will be given of processing for transmitting a print instruction for content data generated by the Web application server group 105 to the print server group 104 to thereby cause the image forming device 102 to print out print data transmitted from the print server group 104 with reference to FIG. 15.

In step S1301, the Web browser 306 requests the Web application 305 to display content data which a user wishes to edit. In step S1302, the Web application 305 transmits the screen for content data corresponding to the requested content to the Web browser 306. In step S1303, the Web browser 306 requests a list screen (FIG. 11A) of image forming devices (service printers) registered in the print service 304 in response to the print instruction given by a user via the screen for content data.

In step S1304, the printer information presentation unit 703 of the print service 304 acquires the list from the printer information storage unit 702. Then, as shown in FIG. 11A, the printer information presentation unit 703 transmits a list screen of service printers corresponding to a user who is using the Web browser 306 to the Web browser 306. Here, the printer information presentation unit 703 functions as a transmission unit that generates a screen through which a user makes print settings and transmits the screen to the Web browser 306. In step S1305, the Web browser 306 requests a print setting screen (FIG. 10B) corresponding to the selected image forming device in response to the selection of an image forming device from the list screen by a user. In step S1306, the printer information presentation unit 703 transmits the print setting screen to the Web browser 306. In step S1307, the Web browser 306 transmits the print instruction input by a user via the print setting screen to the print service 304.

In step S1308, the control unit 706 of the print service 304 acquires identification information about print data to which a print instruction has been given by a user from the Web application 305. Also, the control unit 706 generates a job by combining identification information about print data and print settings. In step S1309, the print job notification unit 709 notifies the print notification reception unit 603 of the relay virtual printer 303 of the fact that the job has been generated. In other words, the print notification reception unit 603 acquires notification information.

In step S1310, the print data acquisition unit 605 requests the print data identification information storage unit 707 of the print service 304 to acquire print data. In step S1311, the print data acquisition unit 605 acquires print data from the print data identification information storage unit 707 and stores the print data in the print data storage unit 606. In step S1312, the print setting acquisition unit 604 requests the print setting storage unit 708 to acquire print settings. In step S1313, the print setting acquisition unit 604 acquires print settings from the print setting storage unit 708 and stores the print settings in the print setting storage unit 607.

In step S1314, the print job notification unit 608 of the relay virtual printer 303 notifies the print notification reception unit 404 of the print control software 301 of the fact that the job has been generated. In step S1315, the print data acquisition unit 406 requests the print data storage unit 606 to acquire print data. In step S1316, the print data acquisition unit 406 acquires print data transmitted from the print data storage unit 606. In step S1317, the print setting acquisition unit 405 requests the print setting storage unit 607 to acquire print settings. In step S1318, the print setting acquisition unit 405 acquires the print settings from the print setting storage unit 607. In step S1319, the print execution unit 408 renders a raster image based on the acquired print settings and print data, and prints the raster image.

Figure 16:
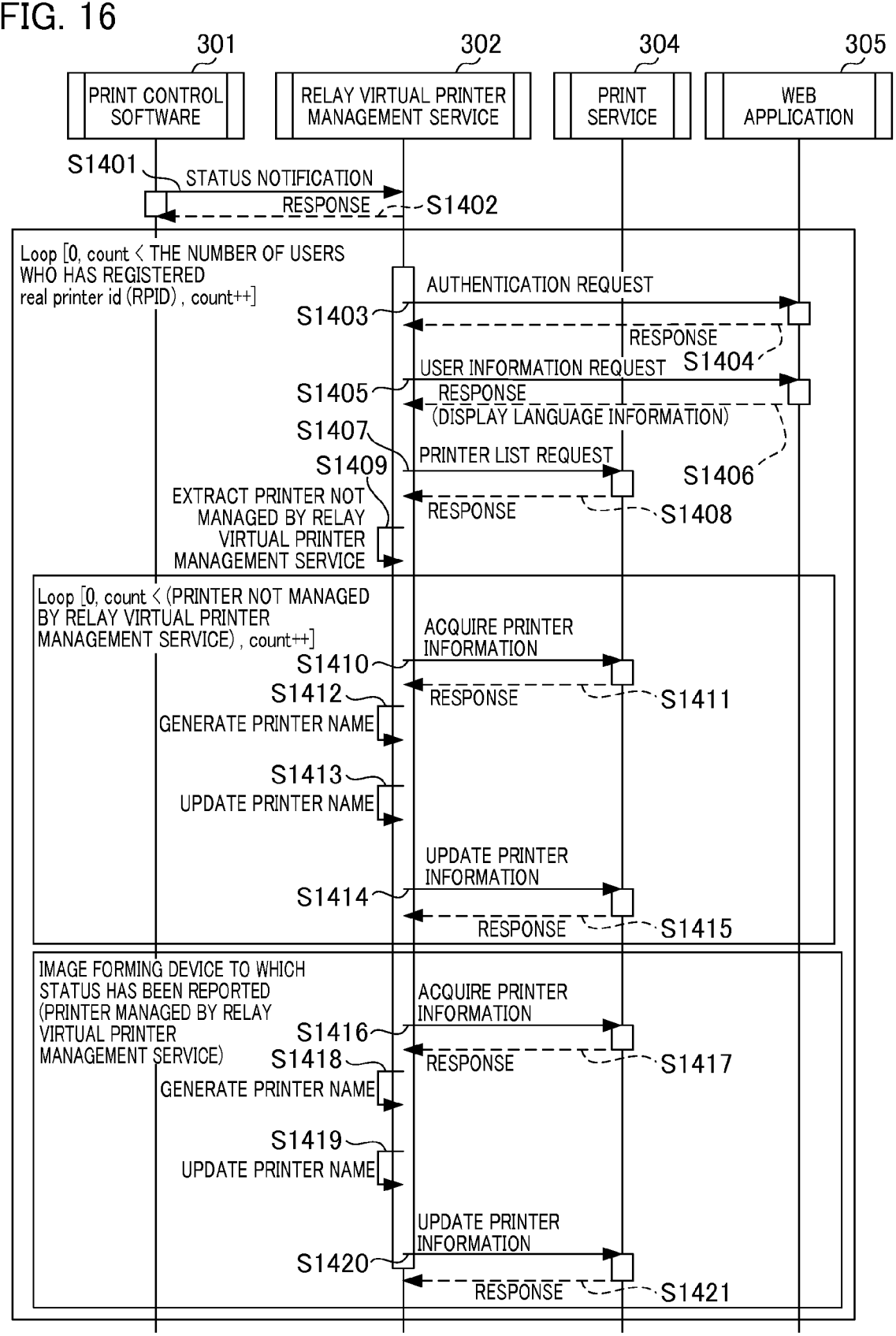
FIG. 16 shows processing for adding status update to a printer name.

Next, a description will be given of processing for recreating the printer name of a printer, of which the status has changed, in the print relay server 103 and updating the printer name in the print server group 104 when there is a change in the status of the image forming device 102 with reference to FIG. 16.

Firstly, when the status of the image forming device 102 is updated, the status management unit 409 of the print control software 301 passes the RPID and the status to the state notification unit 410 in step S1401. The state notification unit 410 transmits the received RPID and status to the state reception unit 507 of the relay virtual printer management service 302. In step S1402, the state reception unit 507 transmits a response indicating reception of the RPID and status back to the state notification unit 410.

In step S1403, the print service user information acquisition unit 510 that has received an instruction from the control unit 502 transmits a user ID and a password corresponding to the RPID to the Web application 305 so as to make an authentication request. When the RPID acquired from the image forming device 102 is registered by a plurality of users, the processes subsequent to step S1403 are performed for the number of a plurality of users. In step S1404, the Web application 305 performs authentication and, if the authentication is successful, transmits the result response including the authentication token back to the print service user information acquisition unit 510. In step S1405, the print service user information acquisition unit 510 transmits the authentication token to the Web application 305 to thereby request user information. In step S1406, the Web application 305 transmits user information back to the print service user information acquisition unit 510. User information includes display language information about a display language to be displayed on a list screen or a print setting screen by the Web browser 306. In other words, the print service user information acquisition unit 510 functions as a language acquisition unit that acquires display language information using acquisition of status information from the image forming device 102 as a trigger.

In step S1407, the printer information acquisition unit 508 of the relay virtual printer management service 302 transmits the authentication token to the printer information presentation unit 703 to thereby make a printer list request. In step S1408, the printer information presentation unit 703 checks the validity of the authentication token and transmits the list of SPIDs, which are shown in reference numeral 813 shown in FIG. 8C for a user and are indicated by the authentication token, as a response back to the printer information acquisition unit 508. In the first embodiment, the printer information presentation unit 703 uses a/Search operation as the Web service provided by the Print Service A in order to acquire the list of SPIDs. The printer information presentation unit 703 designates the authentication token as an input parameter at this time to thereby obtain the list of SPIDs from the printer information storage unit 702. The list of SPIDs corresponds to the first printer list.

In step S1409, the control unit 502 extracts a non-managed image forming device, which is not managed by the print service information management unit, from the received list of SPIDs. More specifically, the control unit 502 extracts an SPID, which is not included in the SPID 805 (second printer list) included in the printer information shown in FIG. 8B managed by the print service information management unit 503, from among the received SPIDs. The control unit 502 specifies an image forming device corresponding to the extracted SPID as an image forming device (non-management image forming device) which is not managed by the print relay server 103. In step S1410, the printer information acquisition unit 508 transmits the authentication token and the SPID of the non-management image forming device to the print service 304 to thereby make a printer information acquisition request for the non-management image forming device.

In the first embodiment, the printer information presentation unit 703 uses a/printer operation as the Web service provided by the Print Service A in order to acquire printer information. The printer information presentation unit 703 designates the authentication token and the SPID as input parameters at this time to thereby obtain printer information. In step S1411, the printer information presentation unit 703 transmits printer information back to the printer information acquisition unit 508. The printer information includes the status and printer name.

In step S1412, the control unit 502 acquires printer information from the print service information management unit 503. The control unit 502 recreates a printer name to which the status acquired from the printer information presentation unit 703 has been added with respect to the printer name acquired from the print service 304 included in the printer list. In step S1413, the print service information management unit 503 updates the printer name using the status and the status update time acquired from the print control software 301 in the management table shown in FIG. 8B and the recreated printer name. In step S1414, the printer information update unit 509 transmits the authentication token, the SPID, the recreated printer name, and the status to the printer information update unit 711 of the print service 304 to thereby make a printer information update request.

In the first embodiment, the printer information update unit 711 uses a/update operation as the Web service provided by the Print Service A in order to update printer information. The printer information update unit 711 designates the authentication token, the SPID, the printer name, and the status as input parameters at this time to thereby update printer information. In step S1415, the printer information update unit 711 of the print service 304 updates printer information and transmits the response back to the printer information update unit 509.

The processes in steps S1410 to S1415 are repeated by the extracted number of image forming devices which are not managed by the relay virtual printer management service 302. The process subsequent to step S1416 is status update processing for updating the status of a printer managed by the relay virtual printer management service 302, i.e., a reception source printer. In step S1416, the printer information acquisition unit 508 transmits the authentication token and the SPID acquired from the print control software 301 to the printer information presentation unit 703 of the print service 304 to thereby make a printer information acquisition request. In step S1417, the printer information presentation unit 703 returns printer information. The printer information includes the status and printer name. In step S1418, the control unit 502 recreates a printer name to which the status acquired from the print control software 301 has been added with respect to the printer name acquired by the printer information acquisition unit 508 via the printer information presentation unit 703. In step S1419, the control unit 502 updates information included in the management table shown in FIG. 8B using the status and the status update time acquired from the state notification unit 410 and the recreated printer name.

In step S1420, the printer information update unit 509 transmits the authentication token, the SPID, the recreated printer name, and the status to the printer information update unit 711 to thereby make a printer information update request. In step S1421, the printer information storage unit 702 updates printer information and transmits the response back to the printer information update unit 509.

In the aforementioned processing steps, the state reception unit 507 acquires status information from the state notification unit 410 or the printer information acquisition unit 508 receives status information from the printer information presentation unit 703. In other words, the state reception unit 507 and the printer information acquisition unit 508 function as a status acquisition unit that acquires status information. When the state reception unit 507 receives a status change notification from the state notification unit 410, the control unit 502 acquires printer information for the print service 304 to thereby update printer information.

According to the print system of the present embodiment, the print relay server 103 that functions as an information processing device adds status information about the image forming device 102 to a printer name to be displayed on the list of image forming devices to which print settings are made by a user. With the aid of the aforementioned structure, even if the print service 304 does not support the function of displaying the status of the image forming device, the print service 304 can display the status of the image forming device 102 on the UI of the Web browser 306. Thus, a print trouble can be reduced during printing. Note that, when the image forming device 102 has the function of the print relay server 103, the image forming device 102 functions as an information processing device or a processing device. In this case, the image forming device 102 that also functions as a processing device can cause the print service 304 to transmit a printer name to which status information has been added to the Web browser 306.

Second Embodiment

Figure 17:
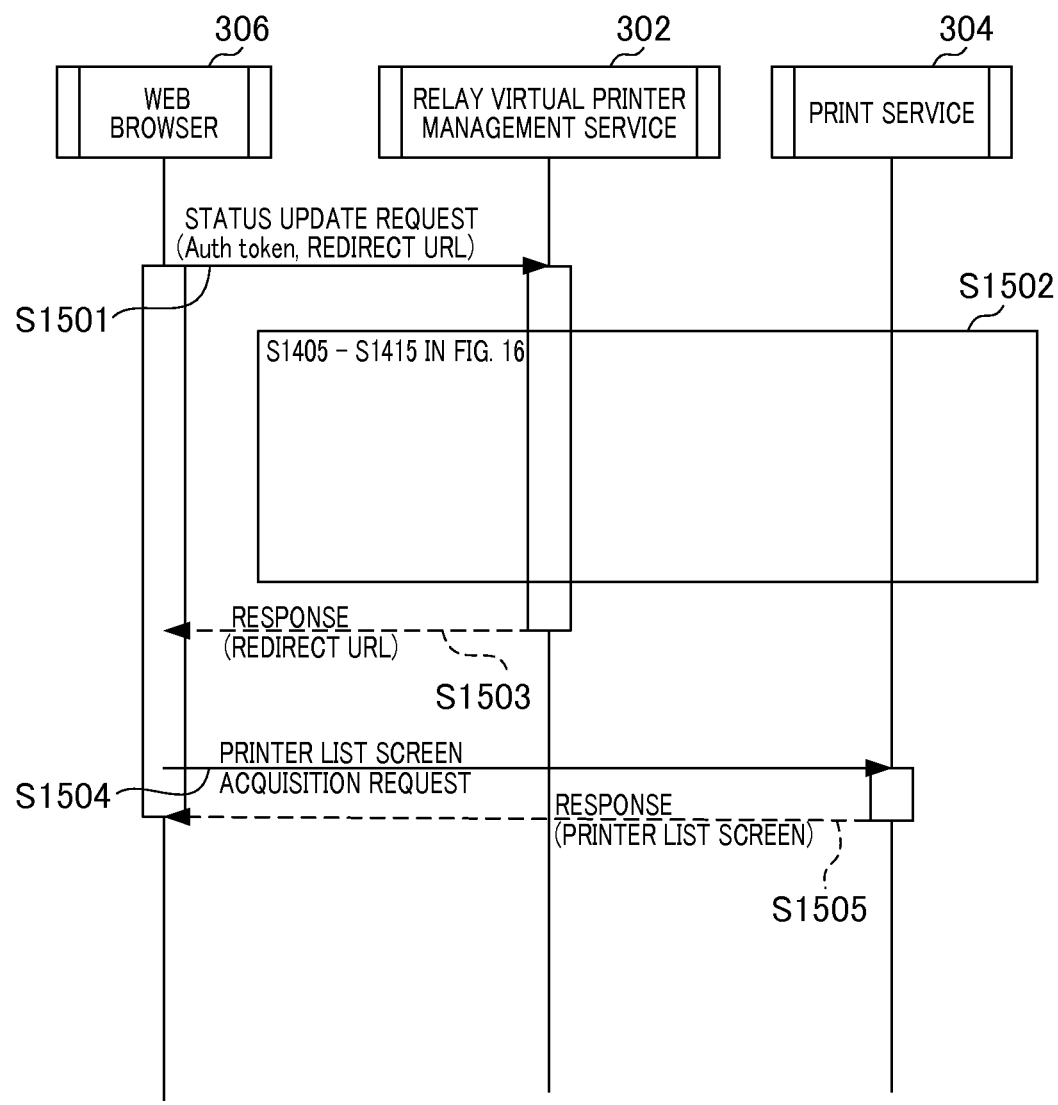
FIG. 17 shows processing for adding status update to a printer name using a user operation as a trigger.

In a second embodiment, a description will be given of a method for updating a printer name to a printer name to which status information about an image forming device not managed by the relay virtual printer management service 302 has been added at any execution timing specified by a user. In the first embodiment, the control unit 502 of the relay virtual printer management service 302 updates the status at the timing at which an image forming device is registered in the relay virtual printer management service 302. Alternatively, the control unit 502 of the relay virtual printer management service 302 receives status information about a non-management image forming device from the print service 304 at the timing at which there is a change in status of an image forming device managed by the print service information management unit 503. Then, the received printer name of the non-management image forming device is updated to a printer name to which status information has been added. The disadvantages of the execution timing are as follows. Unless the two timings occur, an image forming device that is not managed by the relay virtual printer management service 302 does not execute the function of updating the printer name to a printer name to which status information has been added. As the auxiliary function for this, a description will be given of the function of executing a status update at any timing specified by a user with reference to FIGS. 12A and 17.

FIG. 12A shows a printer list screen, which is generated by the print service 304 and is displayed by the Web browser 306, according to the second embodiment. When a user presses down a Status Update button 1013, the Web browser 306 transmits an authentication token and a redirect URL to the state reception unit 507 of the relay virtual printer management service 302 in step S1501 shown in FIG. 17. The redirect URL is the print server group 104. In step S1502, the relay virtual printer management service 302 and the print service 304 execute processing described in steps S1405 to S1415 in FIG. 16 to thereby update printer information. In step S1503, the state reception unit 507 of the relay virtual printer management service 302 transmits a response including the redirect URL back to the Web browser 306. In step S1504, the Web browser 306 transmits the authentication token to the printer information presentation unit 703 of the print service 304 to thereby make a printer list screen acquisition request. In step S1505, the printer information presentation unit 703 creates a printer list screen based on printer information updated from the printer information storage unit 702 and transmits the list screen to the Web browser 306.

The above description has been given of the method for updating a printer name to a printer name to which status information about an image forming device not managed by the relay virtual printer management service 302 has been added at any execution timing specified by a user. In this manner, a user can confirm the status of a non-management image forming device using the printer name at the timing at which the registration system function and the status update system function are not executed.

Third Embodiment

After the image forming device 102 becomes unavailable while being incapable of providing a status change notification to the print relay server 103, the status display on the printer list screen may not be updated while being left in its normal state. If the print server group 104 receives a print instruction through a user operation under such circumstances, a user cannot execute printing and is unaware of whether or not printing has been executed. In such a case, it is effective to provide information indicating authenticity of status display information. Accordingly, in a third embodiment, a description will be given of the function that adds information about authenticity of status information to a printer name. Presenting information to a user enables to notify the user of the fact whether or not the actual state of the image forming device 102 needs to be confirmed prior to printing.

As shown in FIG. 8B, when the status is updated by the function provided by the status update system, the control unit 502 of the relay virtual printer management service 302 records a date at which the status update has been executed in the status update time 808 shown in FIG. 8B. Next, the control unit 502 of the relay virtual printer management service 302 also adds the status update time 808 upon creation of a printer name to which status information has been added (in steps S1412 and S1418). The printer information presentation unit 703 of the print service 304 creates a printer list screen from printer name list information including the status update time, and transmits the printer list screen to the Web browser 306. FIG. 12B shows an exemplary printer list screen. In this manner, a user can confirm authenticity of status information represented in the printer name.

In the printer list shown in FIG. 12B, the printer information presentation unit 703 displays update times for all the printer names. However, the printer information presentation unit 703 may also have a function that adds an update time to each of the printer names of image forming devices, which have not been updated for a predetermined period of time, upon receiving an instruction from the control unit 706. In this case, the image forming device 102 that has not been updated for a predetermined period of time can be represented with emphasis to a user so that the user can recognize the fact that the image forming device 102 may have a problem. Note that displaying the image forming device 102 with a mark, a character string, or the like indicating that the image forming device 102 may have a problem added thereto is more effective.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-272656 filed Dec. 13, 2011, which is hereby incorporated by reference herein in its entirety.

What is claimed is:

1. A relay server that is capable of communicating with a print service server that generates a print job based on print settings set by a user via a print setting screen displayed on a user device and transmits the generated print job to a printer, the relay server comprising:
   a status acquisition unit configured to acquire status information of a printer;
   a storage unit configured to store correspondence information between a status name corresponding to a display language used when the user device displays the print setting screen and a status of a printer in advance;
   a language acquisition unit configured to acquire the display language corresponding to a user who uses the printer using acquisition of the status information from the printer as a trigger; and
   an update unit configured to add the status name indicating the acquired status information to a printer name of the printer and update a printer name in printer information corresponding to the printer managed by the print service server with the printer name to which the status name has been added,
   wherein the update unit determines the status name, which corresponds to the display language, of the status of the printer indicated by status information acquired by the status acquisition unit based on the acquired display language and the correspondence information stored in the storage unit, and adds the determined status name to the printer name of a printer corresponding to status information acquired from the printer, and
   wherein the print service server comprises:
      a management unit configured to manage printer information undated with the printer name to which the status name has been added; and
      a transmission unit configured to generate a print setting screen, on which the printer name to which the status name has been added is to be displayed, based on the printer information managed by the management unit and transmit the generated print setting screen to the user device.

2. The relay server according to claim 1, wherein the relay server further comprises a management unit configured to manage printer information including a printer name of a printer managed by the relay server and status information of the printer,
   wherein the status acquisition unit acquires a first printer list corresponding to the printer information managed by the print service server from the print service server using the acquisition of the status information from the printer as a trigger, specifies a printer not included in a second printer list corresponding to printer information managed by the management unit provided in the relay server as a printer not managed by the relay server from among printers included in the acquired first printer list, and acquires the printer information managed by the print service server corresponding to each of the specified non-managed printer and a transmission source printer of the status information from the print service server,
   wherein the update unit adds a status name included in the acquired printer information corresponding to the status of the non-managed printer, to a printer name in the printer information of the non-managed printer managed by the print service server, and updates a printer name in printer information corresponding to a printer not managed by the relay server managed by the print service server with the printer name to which the status name has been added, and
   wherein the update unit adds a status name indicating the status of the transmission source printer to a printer name in the printer information managed by the print service server corresponding to the transmission source printer of the status information, and updates a printer name in printer information corresponding to a reception source printer managed by the print service server with the printer name to which the status name has been added.

3. The relay server according to claim 1, wherein the update unit provided in the relay server adds a printer status update time to a printer name when updating the printer name included in printer information managed by the print service server, and
   wherein the transmission unit provided in the print service server generates the print setting screen including the printer name to which the update time has been added, and transmits the generated print setting screen to the user device.

4. A method for controlling a relay server that is capable of communicating with a print service server that generates a print job based on print settings set by a user via a print setting screen displayed on a user device and transmits the generated print job to a printer, the method comprising:
   acquiring status information of a printer;
   storing correspondence information between a status name corresponding to a display language used when the user device displays the print setting screen and a status of a printer in advance;
   acquiring the display language corresponding to a user who uses the printer using acquisition of the status information from the printer as a trigger; and
   adding the status name indicating the acquired status information to a printer name of the printer and updating a printer name in printer information corresponding to the printer managed by the print service server with the printer name to which the status name has been added,
   wherein, in the updating, the status name, which corresponds to the display language, of the status of the printer indicated by the acquired status information is determined based on the acquired display language and the stored correspondence information, and the determined status name is added to the printer name of a printer corresponding to the status information acquired from the printer, and
   wherein printer information updated with the printer name to which the status name has been added is managed by the print service server, and a print setting screen on which the printer name to which the status name has been added is displayed is generated by the print service server based on the printer information managed by the print service server and is transmitted to the user device.

5. A non-transitory storage medium on which is stored a computer program for making a computer execute a method for controlling a relay server that is capable of communicating with a print service server that generates a print job based on print settings set by a user via a print setting screen displayed on a user device and transmits the generated print job to a printer, the method comprising:
   acquiring status information of a printer;

storing correspondence information between a status name corresponding to a display language used when the user device displays the print setting screen and a status of a printer in advance;

acquiring the display language corresponding to a user who uses the printer using acquisition of the status information from the printer as a trigger; and adding the status name indicating the acquired status information to a printer name of the printer and updating a printer name in printer information corresponding to the printer managed by the print service server with the printer name to which the status name has been added, wherein, in the updating, the status name, which corresponds to the display language, of the status of the printer indicated by the acquired status information is determined based on the acquired display language and the stored correspondence information, and the determined status name is added to the printer name of a printer corresponding to the status information acquired from the printer, and wherein printer information updated with the printer name to which the status name has been added is managed by the print service server, and a print setting screen on which the printer name to which the status name has been added is displayed is generated by the print service server based on the printer information managed by the print service server and is transmitted to the user device.

* * * * *